US010212655B2

(12) United States Patent
Uchiyama et al.

(10) Patent No.: US 10,212,655 B2
(45) Date of Patent: Feb. 19, 2019

(54) COMMUNICATION CONTROL DEVICE AND COMMUNICATION CONTROL METHOD

(71) Applicant: SONY CORPORATION, Tokyo (JP)

(72) Inventors: Hiromasa Uchiyama, Kanagawa (JP); Hiroaki Takano, Saitama (JP); Nishiki Mizusawa, Kanagawa (JP); Atsushi Yoshizawa, Kanagawa (JP); Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1 day.

(21) Appl. No.: 14/912,578

(22) PCT Filed: Jul. 15, 2014

(86) PCT No.: PCT/JP2014/068786
§ 371 (c)(1),
(2) Date: Feb. 17, 2016

(87) PCT Pub. No.: WO2015/040942
PCT Pub. Date: Mar. 26, 2015

(65) Prior Publication Data
US 2016/0205623 A1  Jul. 14, 2016

(30) Foreign Application Priority Data

Sep. 20, 2013  (JP) ................................ 2013-195192

(51) Int. Cl.
*H04W 52/02* (2009.01)
*H04W 88/08* (2009.01)

(52) U.S. Cl.
CPC ........ *H04W 52/0206* (2013.01); *H04W 88/08* (2013.01); *Y02D 70/00* (2018.01);
(Continued)

(58) Field of Classification Search
CPC ... H04W 52/0206; H04W 88/08; Y02B 60/50
See application file for complete search history.

(56) References Cited

U.S. PATENT DOCUMENTS 6,584,330 B1   6/2003  Ruuska
2007/0066329 A1  3/2007  Laroia et al.
(Continued)

FOREIGN PATENT DOCUMENTS

JP   2012-054971 A   3/2012
JP   2012-532555 A   12/2012
(Continued)

OTHER PUBLICATIONS

Extended European Search Report of EP Patent Application No. 14845762.5, dated Mar. 28, 2017, 08 pages.
(Continued)

*Primary Examiner* — Zhiren Qin
*Assistant Examiner* — Harry H Kim
(74) *Attorney, Agent, or Firm* — Chip Law Group

(57) ABSTRACT

[Object] To make it possible to perform on/off control suitable for individual base stations with a lighter load.
[Solution] There is provided a communication control device including an acquisition unit configured to acquire information indicating a sleep mode selected for a target base station from a plurality of sleep modes for setting a base station in a sleep state, and an application unit configured to apply the sleep mode selected for the target base station to the target base station.

19 Claims, 16 Drawing Sheets

(52) U.S. Cl.
CPC ...... *Y02D 70/1262* (2018.01); *Y02D 70/1264* (2018.01); *Y02D 70/142* (2018.01); *Y02D 70/164* (2018.01); *Y02D 70/166* (2018.01); *Y02D 70/21* (2018.01); *Y02D 70/24* (2018.01); *Y02D 70/26* (2018.01)

(56) References Cited

U.S. PATENT DOCUMENTS

| | | | |
|---|---|---|---|
| 2009/0290561 A1 | 11/2009 | Kleindl | |
| 2011/0170466 A1* | 7/2011 | Kwun | H04W 52/0235 370/311 |
| 2012/0195193 A1* | 8/2012 | Camps Mur | H04W 52/0206 370/230 |
| 2014/0126391 A1* | 5/2014 | Liu | H04W 52/0206 370/252 |
| 2014/0310542 A1* | 10/2014 | Lejeune | G06F 1/3234 713/320 |
| 2016/0174169 A1* | 6/2016 | Harada | H04W 52/44 370/254 |

FOREIGN PATENT DOCUMENTS

| | | |
|---|---|---|
| WO | 2007-035447 A2 | 3/2007 |
| WO | 2007/035447 A3 | 3/2009 |
| WO | 2011-096867 A1 | 8/2011 |

OTHER PUBLICATIONS

Office Action for CN Patent Application No. 201480050063.6, dated Nov. 30, 2018, 6 pages of Office Action and 8 pages of English Translation.

* cited by examiner

COMMUNICATION CONTROL DEVICE AND COMMUNICATION CONTROL METHOD

TECHNICAL FIELD

The present disclosure relates a communication control device and a communication control method.

BACKGROUND ART

The third generation partnership project (3GPP) is keenly discussing small cell enhancement in release 12. In particular, discussions on the small cell enhancement are centered on the on/off operation of a base station in a small cell ("small cell on/off", "small cell dormant" or "small cell DRX").

It is widely known that small cells densely disposed in a heterogeneous network cause mutual interference with signals between the cells and degrade the communication quality. Base stations are always in operation in general irrespective of the statuses of terminal devices. Accordingly, an increase in small cells in number may lead to enormous power consumption in the entire network. It is thus desired to restrict interference or to reduce the power consumption of the entire network by adaptive on/off control over small cells.

As the related art, for example, Patent Literature 1 discloses a technique of operating a base station with low power consumption by using the two operation modes of an active mode and a transmission standby mode for operations with low power consumption.

CITATION LIST

Patent Literature

Patent Literature: JP 2012-54971A

SUMMARY OF INVENTION

Technical Problem

The conventional art including the technique disclosed in Patent Literature 1 may, however, impose a heavy load to perform on/off control suitable for individual base stations. Specifically, for example, suitable on/off control may be different depending on individual base stations. Individually setting on/off control suitable for individual base stations may, however, impose a heavy load from the perspective of the network operation. For example, when a control entity performs on/off control on a plurality of base stations, the control entity transmits complicated control signals to the plurality of base stations. As a result, a heavy load may be imposed from the perspective of the traffic. For example, in this way, performing on/off control suitable for individual base stations may impose a heavy load.

It is then desirable to provide a mechanism that makes it possible to perform on/off control suitable for individual base stations with a lighter load.

Solution to Problem

According to the present disclosure, there is provided a communication control device including: an acquisition unit configured to acquire information indicating a sleep mode selected for a target base station from a plurality of sleep modes for setting a base station in a sleep state; and an application unit configured to apply the sleep mode selected for the target base station to the target base station.

In addition, according to the present disclosure, there is provided a communication control method including: acquiring information indicating a sleep mode selected for a target base station from a plurality of sleep modes for setting a base station in a sleep state; and applying, by a processor, the sleep mode selected for the target base station to the target base station.

In addition, according to the present disclosure, there is provided a communication control device including: an acquisition unit configured to, when information indicating a sleep mode selected from a plurality of sleep modes for setting a base station in a sleep state is provided, acquire the information indicating the sleep mode; and a control unit configured to control an operation of the base station in accordance with the sleep mode.

Advantageous Effects of Invention

According to the present disclosure as described above, it is possible to perform on/off control suitable for individual base stations with a lighter load. The above-described advantageous effects are not necessarily limitary, but any of the advantageous effects shown herein or another advantageous effect that can be grasped herein may be attained in combination with the above-described advantageous effects or instead of the above-described advantageous effects.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Now, the description will be made in the following order.
1. Schematic Configuration of Communication System
2. Specific Examples of Sleep Modes
3. Configuration of Each Node
 3.1. Configuration of Sleep Mode Manager (SMM)
 3.2. Configuration of Macro Cell Base Station
 3.3. Configuration of Small Cell Base Station
 3.4. Configuration of Terminal Device
4. Flow of Processing
5. Application Examples
 5.1. Application Example for Sleep Mode Manager (SMM)
 5.2, Application Example for Macro Cell Base Station
 5.3. Configuration of Small Cell Base Station
6. Conclusion

1. SCHEMATIC CONFIGURATION OF COMMUNICATION SYSTEM

Figure 1:
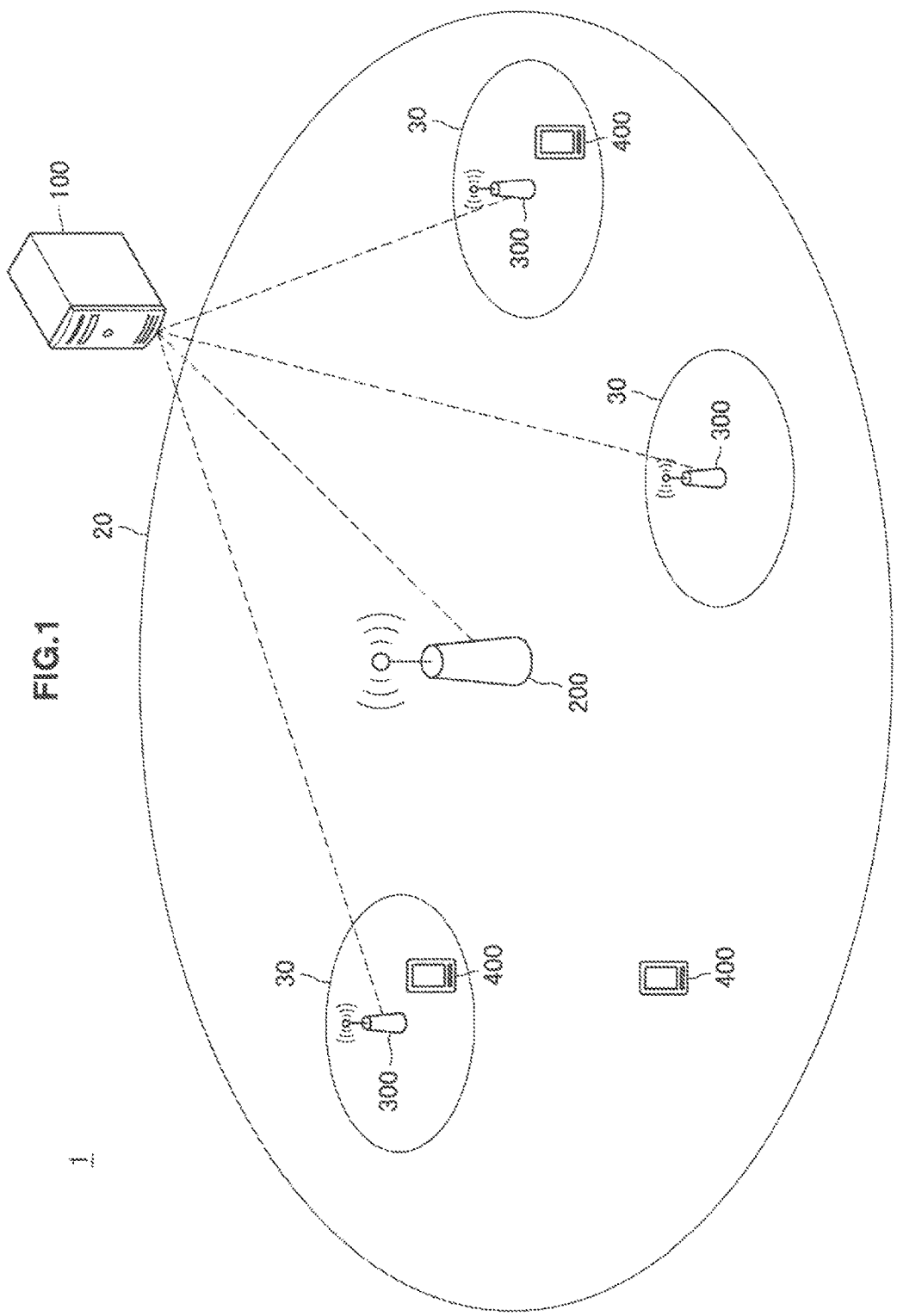
FIG. 1 is an explanatory diagram illustrating an example of a schematic configuration of a communication system according to an embodiment of the present disclosure.

First of all, a schematic configuration of a communication system 1 according to an embodiment of the present disclosure will be described with reference to FIG. 1. FIG. 1 is an explanatory diagram illustrating an example of the schematic configuration of the communication system 1 according to an embodiment of the present disclosure. FIG. 1 illustrates that the communication system 1 includes a sleep mode manager (SMM) 100, a macro cell base station 200, a small cell base station 300, and a terminal device 400. The communication system 1 is a system that is compliant, for example, with long term evolution (LTE), LTE-Advanced, or a communication scheme that conforms to them.

The SMM 100 performs on/off control (i.e. control over an on/off operation) on a base station. The SMM 100 applies a sleep mode to a base station to perform on/off control on the base station in an embodiment of the present disclosure. For example, the SMM 100 applies a sleep mode to the macro cell base station 200 and the small cell base station 300.

The macro cell base station 200 wirelessly communicates with a terminal device 400 positioned within a macro cell 20. For example, the macro cell base station 200 performs an on/off operation in accordance with control performed by the SMM 100. The macro cell base station 200 performs an on/off operation in accordance with a sleep mode that the SMM 100 applies to the macro cell base station 200 in an embodiment of the present disclosure.

The small cell base station 300 wirelessly communicates with the terminal device 4000 positioned within the small cell 30. For example, the small cell base station 300 performs an on/off operation in accordance with control performed by the SMM 100. The small cell base station 300 performs an on/off operation in accordance with a sleep mode that the SMM 100 applies to the small cell base station 300 in an embodiment of the present disclosure.

The terminal device 400 wirelessly communicates with a base station. For example, when positioned within the macro cell 20, the terminal device 400 wirelessly communicates with the macro cell base station 200. For example, when positioned within the small cell 30, the terminal device 400 wirelessly communicates with the small cell base station 300.

2. SPECIFIC EXAMPLES OF SLEEP MODES

Next, specific examples of sleep modes according to an embodiment of the present disclosure will be described.

A plurality of sleep modes for setting a base station in a sleep state are prepared especially in an embodiment of the present disclosure. A sleep mode selected for a target base station (such as the macro cell base station 200 and/or the small cell base station 300) from the plurality of sleep modes is applied to the target base station.

For example, the plurality of sleep modes includes two or more types of sleep modes for setting a base station in the sleep state from different angles.

Link Sleep Mode

For example, the plurality of sleep modes include one or more link sleep modes for setting a base station in the sleep state in one or both of the downlink and the uplink.

Specifically, the plurality of sleep modes include, for example, a first link sleep mode for setting a base station in the sleep state in both of the downlink and the uplink, a second link sleep mode for setting a base station in the sleep state in only the downlink, and a third link sleep mode for setting a base station in the sleep state in only the uplink. That is to say, the following link sleep modes are, for example, prepared.

TABLE 1

| SLEEP MODE IDENTIFICATION INFORMATION | CONTENT OF SLEEP MODES |
|---|---|
| Mode-L1 | SLEEP IN BOTH DOWNLINK AND UPLINK |
| Mode-L2 | SLEEP IN ONLY DOWNLINK |
| Mode-L3 | SLEEP IN ONLY UPLINK |

Furthermore, if carrier aggregation is employed, the link sleep mode for setting a base station in the sleep state in the uplink and/or the downlink may be prepared from the perspective of the component carrier (CC). For example, a link sleep mode for setting a base station in the sleep state in the uplink and/or the downlink in a specific component carrier may be prepared.

For example, some of base stations may be desirably set in the sleep state in one link direction of the downlink and the uplink. In such a case, the use of the link sleep mode facilitates the base station to be set in the sleep state in only the one link direction.

Time Sleep Mode

The plurality of sleep modes include, for example, one or more time sleep modes for setting a base station in the sleep state at any of time.

Furthermore, the plurality of sleep modes include, for example, at least two time sleep modes for setting a base station in the sleep state at time of different granularities.

Specifically, the plurality of sleep modes include, for example, a first time sleep mode, a second time sleep mode, and a third time sleep modes for setting a base station in the sleep state in units of hours, minutes, and seconds, respectively. In addition, the plurality of sleep modes include, for example, a fourth time sleep mode and a fifth time sleep mode for setting a base station in the sleep state in units of wireless frames and sub-frames, respectively. Furthermore, the plurality of sleep modes include, for example, a sixth time sleep mode for setting a base station in the sleep state in given time units. That is to say, the following time sleep modes are, for example, prepared.

TABLE 2

| SLEEP MODE IDENTIFICATION INFORMATION | CONTENT OF SLEEP MODES |
| --- | --- |
| Mode-T1 | SLEEP IN UNITS OF HOURS |
| Mode-T2 | SLEEP IN UNITS OF MINUTES |
| Mode-T3 | SLEEP IN UNITS OF SECONDS |
| Mode-T4 | SLEEP IN UNITS OF WIRELESS FRAMES |
| Mode-T5 | SLEEP IN UNITS OF SUB-FRAMES |
| Mode-T6 | SLEEP IN GIVEN TIME UNITS |

For example, some of base stations may be desirably set in the sleep state for a period of time (e.g. in the night-time or during a specific wireless frame). In such a case, the use of the time sleep mode facilitates the base station to be set in the sleep state for only the period of time.

Preparing time sleep modes corresponding to different granularities makes it possible to specify various periods of time with a smaller amount of information. As an example, if a period of time for which it is desirable to set a base station in the sleep mode coincides with a specific wireless frame, the use of Mode-T4 to Mode-T6 makes it possible to specify the period of time. In this case, the use of the Mode-T4 makes it possible to specify the specific wireless frame with a smaller amount of information than the use of the other time sleep modes does. As another example, if a period of time for which it is desirable to set a base station in the sleep mode coincides with the night-time (e.g. from 0:00 to 6:00), the use of any of Mode-T1 to the Mode-T6 makes it possible to specify the period of time. In this case, the use of the Mode-T makes it possible to specify the night-time with a smaller amount of information than the use of the other time sleep modes does. Additionally, it is possible to specify a period of time with a smaller amount of information. Accordingly, a smaller amount of information is transmitted, and then the overhead may be decreased.

Frequency Sleep Mode

The plurality of sleep modes include, for example, one or more frequency sleep modes for setting a base station in the sleep state in any of frequency bands.

Furthermore, the plurality of sleep modes include, for example, at least two frequency sleep modes for setting a base station in the sleep state in frequency bands of different granularities.

Specifically, the plurality of sleep modes include, for example, a first frequency sleep mode, a second frequency sleep mode, a third frequency sleep mode, and a fourth frequency sleep mode for setting a base station in the sleep state in units of CCs, resource block groups (RBGs), resource blocks (RBs), and sub-carriers, respectively. Furthermore, the plurality of sleep modes include, for example, a fifth frequency sleep mode for setting a base station in the sleep state in given band units. That is to say, the following frequency sleep modes are, for example, prepared.

TABLE 3

| SLEEP MODE IDENTIFICATION INFORMATION | CONTENT OF SLEEP MODES |
| --- | --- |
| Mode-F1 | SLEEP IN UNITS OF CCS |
| Mode-F2 | SLEEP IN UNITS OF RBGS |
| Mode-F3 | SLEEP IN UNITS OF RBS |
| Mode-F4 | SLEEP IN UNITS OF SUB-CARRIERS |
| Mode-F5 | SLEEP IN GIVEN BAND UNITS |

For example, some of base stations may be desirably set in the sleep state in a part of frequency bands (such as a part of CCs or a part of RBGs). In such a case, the use of the frequency sleep mode facilitates the base station to be set in the sleep state in only a part of frequency bands.

Preparing frequency sleep modes corresponding to different granularities makes it possible to specify various frequency bands with a smaller amount of information. As an example, if a frequency band in which it is desirable to set a base station in the sleep mode coincides with a part of RBGs, the use of Mode-F2 to Mode-F5 makes it possible to specify the frequency band. In this case, the use of the Mode-F2 makes it possible to specify the part of RBGs with a smaller amount of information than the use of the other frequency sleep modes does. As another example, if a frequency band in which it is desirable to set a base station in the sleep mode coincides with a part of CCs, the use of Mode-F1 to Mode-F5 makes it possible to specify the frequency band. In this case, the use of the Mode-F1 makes it possible to specify the part of CCs with a smaller amount of information than the use of the other frequency sleep modes does. Additionally, it is possible to specify a period of time with a smaller amount of information. Accordingly, a smaller amount of information is transmitted, and then the overhead may be decreased.

Channel Sleep Mode

The plurality of sleep modes include, for example, one or more channel sleep modes for setting a base station in the sleep state in any of channels.

Furthermore, the plurality of sleep modes include, for example, at least two channel sleep modes for setting a base station in the sleep state in different channels.

Specifically, the plurality of sleep modes include, for example, a first channel sleep mode for setting a base station in the sleep state in a channel for a synchronization signal. The synchronization signal includes, for example, a primary synchronization signal (PSS) and a secondary synchronization signal (SSS).

The plurality of sleep modes include, for example, a second channel sleep mode for setting a base station in the sleep state in a channel for a reference signal. The reference signal includes, for example, a cell specific reference signal (CRS), a demodulation reference signal (DM-RS), and/or a channel state information reference signal (CSI-RS).

The plurality of sleep modes include, for example, a third channel sleep mode for setting a base station in the sleep state in a channel for a control signal. The channel for the control signal includes, for example, a physical broadcast channel (PBCH), a physical downlink control channel (PD-CCH), a physical hybrid ARQ indicator channel (PHICH), a physical control format indicator channel (PCFICH), a physical control format indicator channel (PCHICH), a physical uplink control channel (PUCCH), and/or a physical random access channel (PRACH).

The plurality of sleep modes include, for example, a fourth channel sleep mode for setting a base station in the sleep state in a channel for a data signal. The channel for the data signal includes, for example, a physical downlink shared channel (PDSCH), a physical uplink shared channel (PUSCH), and/or a PBCH.

Furthermore, the plurality of sleep modes include, for example, a fifth channel sleep mode for setting a base station in the sleep state in a given channel.

That is to say, the following channel sleep modes are, for example, prepared.

TABLE 4

| SLEEP MODE IDENTIFICATION INFORMATION | CONTENT OF SLEEP MODES |
| --- | --- |
| Mode-C1 | SLEEP IN CHANNEL FOR SYNCRONIZATION SIGNAL |
| Mode-C2 | SLEEP IN CHANNEL FOR REFERENCE SIGNAL |
| Mode-C3 | SLEEP IN CHANNEL FOR CONTROL SIGNAL |
| Mode-C4 | SLEEP IN CHANNEL FOR DATA SIGNAL |
| Mode-C5 | SLEEP IN GIVEN CHANNEL |

For example, some of base stations may be desirably set in the sleep state in a part of channels. In such a case, the use of the channel sleep mode facilitates the base station to be set in the sleep state in only a part of channels.

As described above, two or more types of sleep modes for setting a base station in the sleep state from different angles are prepared. Accordingly, simply selecting a sleep mode makes it possible to cause sleep from a variety of angles. Various kinds of sleep can be specified with a smaller amount of information. As a result, a smaller amount of information is transmitted, and then the overhead may be decreased. In this way, it is possible to perform on/off control suitable for individual base stations with a lighter load.

It should be noted that the plurality of sleep modes are not limited to the above-described examples, but may include a variety of sleep modes.

3. CONFIGURATIONS OF EACH NODE

Next, the configurations of the SMM 100, the macro cell base station 200, the small cell base station 300, and the terminal device 400 according to an embodiment of the present disclosure will be described with reference to FIGS. 2 to 5.

<3.1. Configuration of SMM>>

Figure 2:
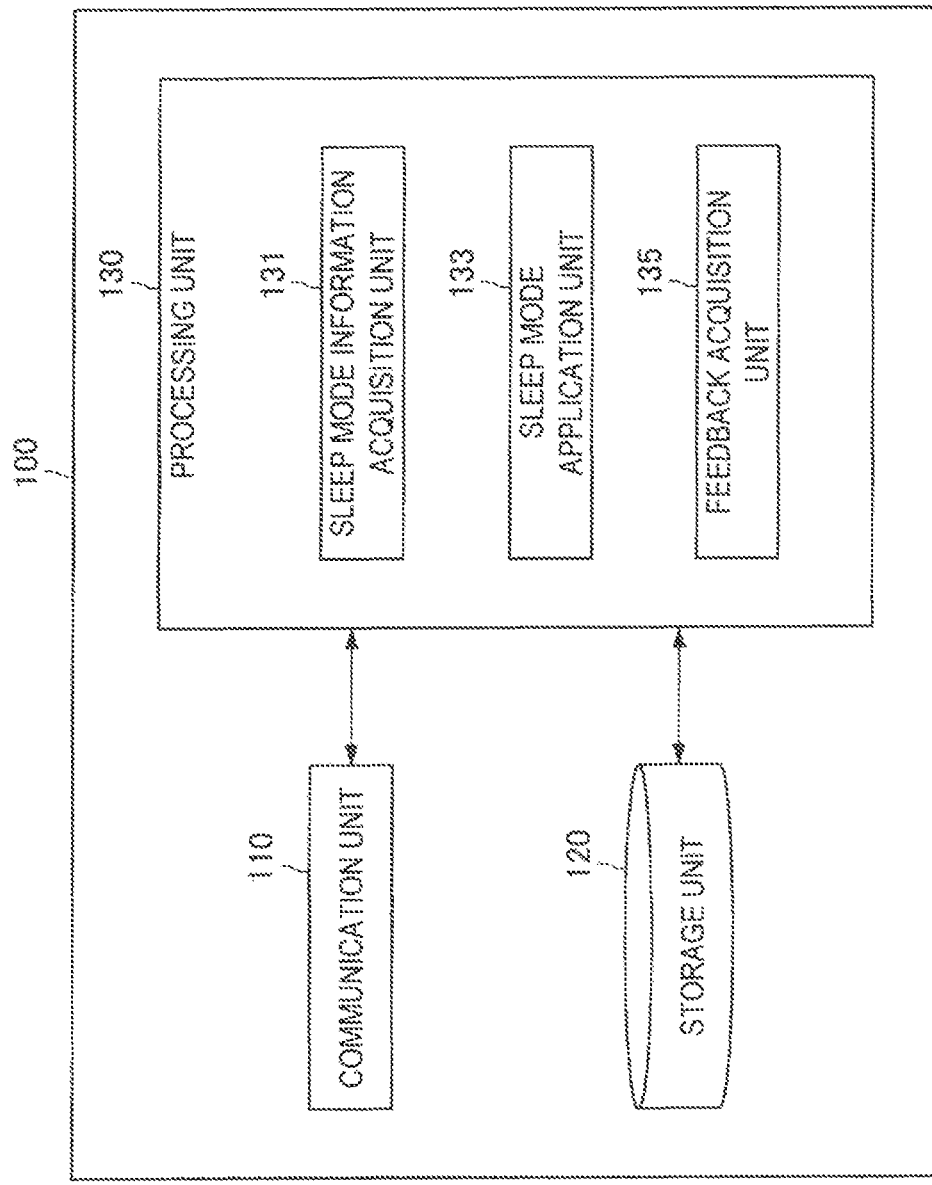
FIG. 2 is a block diagram illustrating an example of a configuration of a sleep mode manager (SMM) according to an embodiment of the present disclosure.

First of all, an example of the configuration of the SMM 100 according to an embodiment of the present disclosure will be described with reference to FIG. 2. FIG. 2 is a block diagram illustrating an example of the configuration of the SMM 100 according to an embodiment of the present disclosure. FIG. 2 illustrates that the SMM 100 includes a communication unit 110, a storage unit 120, and a processing unit 130.

(Communication Unit 110)

The communication unit 110 communicates with another node. For example, the communication unit 110 communicates with the macro cell base station 200 and the small cell base station 300.

(Storage Unit 120)

The storage unit 120 temporarily or persistently stores a program and data for the operation of the SMM 100.

(Processing Unit 130)

The processing unit 130 provides a variety of functions of the SMM 100. The processing unit 130 includes a sleep mode information acquisition unit 131, a sleep mode application unit 133, and a feedback acquisition unit 135.

(Sleep Mode Information Acquisition Unit 131)

The sleep mode information acquisition unit 131 acquires information (which will be referred to as "sleep mode information" below) indicating a sleep mode selected for a target base station from the plurality of sleep modes for setting a base station in the sleep state.

Target Base Station

For example, the target base station is a base station to which a sleep mode is applied, and the target base station is the macro cell base station 200 or the small cell base station 300. As an example, notified of a target base station by the sleep mode application unit 133, the sleep mode information acquisition unit 131 acquires information (i.e. sleep mode information) indicating a sleep mode selected for the target base station.

Plurality of Sleep Modes

The plurality of sleep modes includes two or more types of sleep modes for setting a base station in the sleep state from different angles. As discussed above, the plurality of sleep modes include, for example, the one or more link sleep modes, the one or more time sleep modes, the one or more frequency sleep modes, and/or the one or more channel sleep modes.

Combination of Sleep Modes

For example, the sleep mode information acquisition unit 131 acquires, as the sleep mode information, information indicating a combination of two or more types of sleep modes selected for a target base station from the plurality of sleep modes.

More specifically, for example, a combination of two or more sleep modes is selected for a target base station from the link sleep modes, the time sleep modes, the frequency sleep modes, and the channel sleep modes. The sleep mode information acquisition unit 131 then acquires sleep mode information indicating the combination of the two or more sleep modes.

As an example, the combination of the Mode-L2 (sleep in only the downlink) and the Mode-T5 (sleep in units of sub-frames) is selected for a base station. The sleep mode information acquisition unit 131 then acquires sleep mode information indicating the combination of the Mode-L2 and the Mode-T5. This combination of the Mode-L2 and the Mode-T5 makes it possible to set a base station in the sleep state in only the downlink in units of sub-frames.

This combination of sleep modes makes it possible to cause sleep from further various angles. That is to say, it is possible to perform on/off control more suitable for individual base stations with a lighter load.

Sleep Mode Information on Plurality of Base Stations

For example, the sleep mode information acquisition unit 131 acquires information (i.e. sleep mode information) indicating a sleep mode selected for each of a plurality of target base stations from the plurality of sleep modes.

Selection of Sleep Mode

Selection by Operator

For example, an operator of the communication system 1 selects any of the sleep modes (or a combination of sleep modes) in advance for a base station from the plurality of sleep modes. Sleep mode information indicating the sleep mode which is selected in advance is stored (for example, in the storage unit 120).

The operator of the communication system 1 selects a sleep mode, for example, on the basis of statistical information on the base station. Specifically, for example, the operator of the communication system 1 decides a range within which to set a base station in the sleep state, on the basis of the statistical information, and selects a sleep mode suitable for the specified range.

As an example, the statistical information includes information on the traffic volume in the cell of a base station for each period of time, and indicates that a period of time (such as the night-time) experiences an extremely small traffic volume. In this case, the operator of the communication system 1 decides a combination of the period of time and a part of frequency bands (e.g. a part of CCs) on the basis of the statistical information as the range within which to set a base station in the sleep state to reduce the power consumption. The operator selects a combination of any of the time sleep modes (such as the Mode-T1) and any of the frequency sleep modes (such as the Mode-F1) for the base station.

As another example, the statistical information includes information on the number of terminal devices in the cell of a base station for each period of time, and indicates that an extremely small number of terminal devices exit in a period of time (such as the night-time). In this case, the operator of the communication system 1 decides a combination of the period of time and a part of frequency bands (e.g. a part of CCs) on the basis of the statistical information as the range within which to set a base station in the sleep state to reduce the power consumption. The operator selects a combination of any of the time sleep modes (such as the Mode-T1) and any of the frequency sleep modes (such as the Mode-F1) for the base station.

As still another example, the statistical information includes information on the interference level of each channel in the cell of the base station, and indicates that a channel (such as the data channel) has a high interference level. In this case, the operator of the communication system 1 decides a combination of the channel (such as a channel for a data signal) and a period of time (such as a sub-frame) on the basis of the statistical information as the range within which to set a neighboring base station of the base station in the sleep state to reduce the interference between cells. The operator selects a combination of the sleep mode (Mode-C4) for sleep in the channel and any of the time sleep modes (such as the Mode-T5) for the neighboring base station.

As described above, a sleep mode is selected, and then the sleep mode information is stored. For example, information indicating a specific range within which to set a base station in the sleep mode may also be stored. As an example, the information indicating the range is stored as parameter information corresponding to the sleep mode information. As a specific example, information indicating a specific frequency band (such as information indicating a specific CC) may be stored as parameter information corresponding to a frequency sleep mode (such as the Mode-F1). As another specific example, information indicating specific time (such as information indicating a specific wireless frame including a system frame number (SFN)) may be stored as parameter information corresponding to a time sleep mode (such as the Mode-T4).

Additionally, the operator of the communication system 1 may select a sleep mode on the basis of position information indicating the position of a base station instead of the statistical information or in addition to the statistical information. For example, the traffic volume in the cell of a base station may vary in accordance with the position of the base station. As an example, the cell of a base station positioned in a station has a large traffic volume. As another example, the cell of a base station positioned in the suburb has a small traffic volume. Thus a sleep mode may be selected in accordance with the position of a base station.

Selection by SMM

The SMM 100 (such as the sleep mode information acquisition unit 131) may automatically select any of the sleep modes (or a combination of sleep modes) from the plurality of sleep modes for a base station instead of the operator of the communication system 1.

The SMM 100 may select a sleep mode in advance, for example, on the basis of statistical information on a base station. In this case, for example, not the operator, but the SMM 100 may automatically select a sleep mode on the basis of the statistical information as discussed above. Sleep mode information indicating the sleep mode which is selected by the SMM 100 in advance may be stored (for example, in the storage unit 120).

Alternatively, the SMM 100 may select a sleep mode as needed. In this case, the SMM 100 may select a sleep mode as needed, for example, on the basis of a result obtained through the monitoring done by a base station (such as the traffic volume, the number of terminal devices, the interference level, or the communication quality) discussed below. As an example, when the cell of a base station has no terminal devices, the SMM 100 may decide a given period of time (such as a predetermined number of wireless frames) as the range within which to set the base station in the sleep state to reduce the power consumption. The operator may then select any of the time sleep modes (such as the Mode-T4) for the base station. As another example, when the high interference level is high and the communication quality (throughput) is low in a CC used by a base station, the SMM 100 may decide the combination of the CC and the period of time (such as a sub-frame) as the range within which to set a neighboring base station of the base station in the sleep state to reduce the interference between cells. The operator may select a combination of any of the frequency sleep modes (such as the Mode-F1) and any of the time sleep modes (such as the Mode-T5) for the base station.

Additionally, SMM 100 may select a sleep mode on the basis of position information indicating the position of a base station instead of the statistical information or in addition to the statistical information. The SMM 100) may also select a sleep mode on the basis of information indicating the purpose of setting a base station in the sleep state instead of the statistical information or in addition to the statistical information. The power consumption or the interference between cells may be reduced as the purpose. The purpose may be set for each base station, for each group of base stations, or for the whole of the communication system 1.

Technique of Acquiring Sleep Mode Information

For example, as discussed above, any of the sleep modes (or a combination of sleep modes) is selected for a base station in advance from the plurality of sleep modes. Sleep mode information indicating the selected sleep mode (or the combination of sleep modes) is then stored (for example, in the storage unit 120). In this case, the sleep mode information acquisition unit 131 acquires the stored sleep mode information.

Alternatively, as discussed above, any of the sleep modes (or a combination of sleep modes) may be selected for a base station from the plurality of sleep modes as needed. In this case, the sleep mode information acquisition unit 131 may also acquire, as needed, sleep mode information indicating a sleep mode selected as needed.

(Sleep Mode Application Unit 133)

The sleep mode application unit 133 applies the sleep mode selected for a target base station to the target base station.

For example, the sleep mode application unit 133 notifies the sleep mode information acquisition unit 131 of a target base station to which a sleep mode is applied. The sleep mode information acquisition unit 131 then acquires sleep mode information on the target base station, and the sleep mode application unit 133 applies the sleep mode indicated by the acquired sleep mode information to the target base station. The sleep mode is selected for the target base station from the plurality of sleep modes.

Applying a sleep mode selected from the plurality of sleep modes in this way makes it possible to cause various kinds of sleep by simply selecting a sleep mode. That is to say, it is possible to perform on/off control suitable for individual base stations with a lighter load.

Application of Combination of Sleep Modes

For example, the sleep mode application unit 133 applies a combination of two or more types of sleep modes to the target base station.

More specifically, for example, the sleep mode application unit 133 applies a combination of two or more sleep modes of the link sleep modes, the time sleep modes, the frequency sleep modes, and the channel sleep modes to the target base station.

As an example, as discussed above, when sleep mode information indicates the combination of the Mode-L2 and the Mode-T5, the sleep mode application unit 133 applies the combination of the Mode-L2 and the Mode-T5 to the target base station. This combination of the Mode-L2 and the Mode-T5 makes it possible to set a base station in the sleep state in only the downlink in units of sub-frames.

The application of this combination of sleep modes makes it possible to cause sleep from further various angles. That is to say, it is possible to perform on/off control more suitable for individual base stations with a lighter load.

Technique of Applying Sleep Mode

For example, the sleep mode application unit 133 applies the sleep mode selected for the target base station to the target base station by scheduling the sleep mode.

More specifically, the sleep mode application unit 133 generates scheduling information on the sleep mode, for example, on the basis of sleep mode information and parameter information (information indicating a specific range within which to set the base station in the sleep state) corresponding to the sleep mode information. The sleep mode application unit 133 then provides the scheduling information to the target base station via the communication unit 110. This allows the target base station to apply the sleep mode.

Scheduling Information

The scheduling information includes, for example, sleep mode information indicating a sleep mode (or a combination of sleep modes) and parameter information (information indicating a specific range within which to set a base station in the sleep state) corresponding to the sleep mode information.

The scheduling information further includes, for example, information indicating the effective period (period of effective scheduling) and/or information indicating an effective area (geographical area of effective scheduling).

Triger of Scheduling

Periodic Scheduling

As a first example, the sleep mode application unit 133 periodically schedules a sleep mode. That is to say, the sleep mode application unit 133 performs periodic scheduling. For example, if a specific range within which to set a base station in the sleep state is decided in advance, this makes it possible to automatically set a base station in the sleep state without fail.

If this periodic scheduling is performed, a scheduling target base station (i.e. base station to which a sleep mode is applied) is, for example, a base station to which it is decided to apply a sleep mode at the coming period.

Aperiodic Scheduling

As a second example, the sleep mode application unit 133 performs the scheduling in accordance with a request of a sleep mode. That is to say, the sleep mode application unit 133 performs aperiodic scheduling. For example, this makes it possible to set a base station in the sleep mode whenever necessary.

Specifically, for example, a base station requests a sleep mode to be scheduled. The sleep mode application unit 133 then coordinates a sleep mode (e.g. confirms the sleep state) with a nearby base station of the base station, and determines whether to schedule a sleep mode for the base station or the nearby base station of the base station. If the determination is true, the sleep mode application unit 133 schedules a sleep mode.

If this aperiodic scheduling is performed, a scheduling target base station (i.e. base station to which a sleep mode is applied) is, for example, a base station that has made the request or a nearby base station of the base station.

The request is made, for example, in accordance with a result obtained through the monitoring done by the base station. For example, this makes it possible to set a base station in the sleep mode in accordance with the status of the base station.

The monitoring includes, for example, monitoring any of the traffic volume, the number of terminal devices, the interference level, and the communication quality. For example, this makes it possible to set a base station in the sleep state in accordance with the necessity of reducing the power consumption or reducing the interference between cells.

Additionally, only one of the periodic scheduling and the aperiodic scheduling may be employed, or both of the periodic scheduling and the aperiodic scheduling may also be employed.

Application of Sleep Mode to Plurality of Base Stations

For example, the sleep mode application unit 133 applies a sleep mode selected from the plurality of sleep modes to each of a plurality of target base stations.

Additionally, on the basis of the application of a sleep mode to another target base station of the plurality of target base stations, the sleep mode application unit 133 may apply a sleep mode to any of the plurality of target base stations.

For example, on the basis of the scheduling of a sleep mode for the other target base station, the sleep mode application unit 133 may schedule a sleep mode for the target base station.

As an example, a sleep mode may be scheduled for the two neighboring small cell base stations 300 in a manner that the two small cell base stations 300 are alternately set in the sleep mode with respect to the time axis. More specifically, the scheduling may be performed in a manner that, for a period for which one of the small cell base stations 300 is in the sleep state, the other small cell base station 300 is set on. This prevents the two small cell base stations 300 from being concurrently set in the sleep state.

On the basis of the application situation of a sleep mode to the plurality of target base stations, the sleep mode application unit 133 may apply a predetermined control parameter related to wireless communication to any of the plurality of the target base stations.

As an example, on the basis of a first small cell base station 300 in the sleep state for a period, the sleep mode application unit 133 may apply more transmission power to a second small cell base station 300 positioned in the vicinity of the first small cell base station 300. As a result, the small cell 30 of the second small cell base station 300 may be enlarged to cover a part or the whole of the small cell 30 of the first small cell base station 300, which is in the sleep state.

In this way, applying the predetermined control parameter, for example, allows a plurality of base stations to back up each other.

(Feedback Acquisition Unit 135)

The feedback acquisition unit 135 acquires feedback information indicating a result of an evaluation of the application of a sleep mode selected for a target base station to the target base station.

As discussed below, the feedback information includes, for example, the amount of power consumption reduced through the application of a sleep mode or the interference level and/or the communication quality (e.g. throughput) through the application of a sleep mode.

For example, this makes it possible to reflect the feedback information to decide a specific range within which to set a base station in the sleep state and to select a sleep mode. As a result, for example, a specific range can be decided and a sleep mode can be selected more appropriately in the future. That is to say, it is possible to cause a base station to sleep more precisely. Additionally, the feedback information may be reflected by the operator of the communication system 1, or may also be automatically reflected by the SMM 100 (such as the feedback acquisition unit 135).

<3.2. Configuration of Macro Cell Base Station>>

Figure 3:
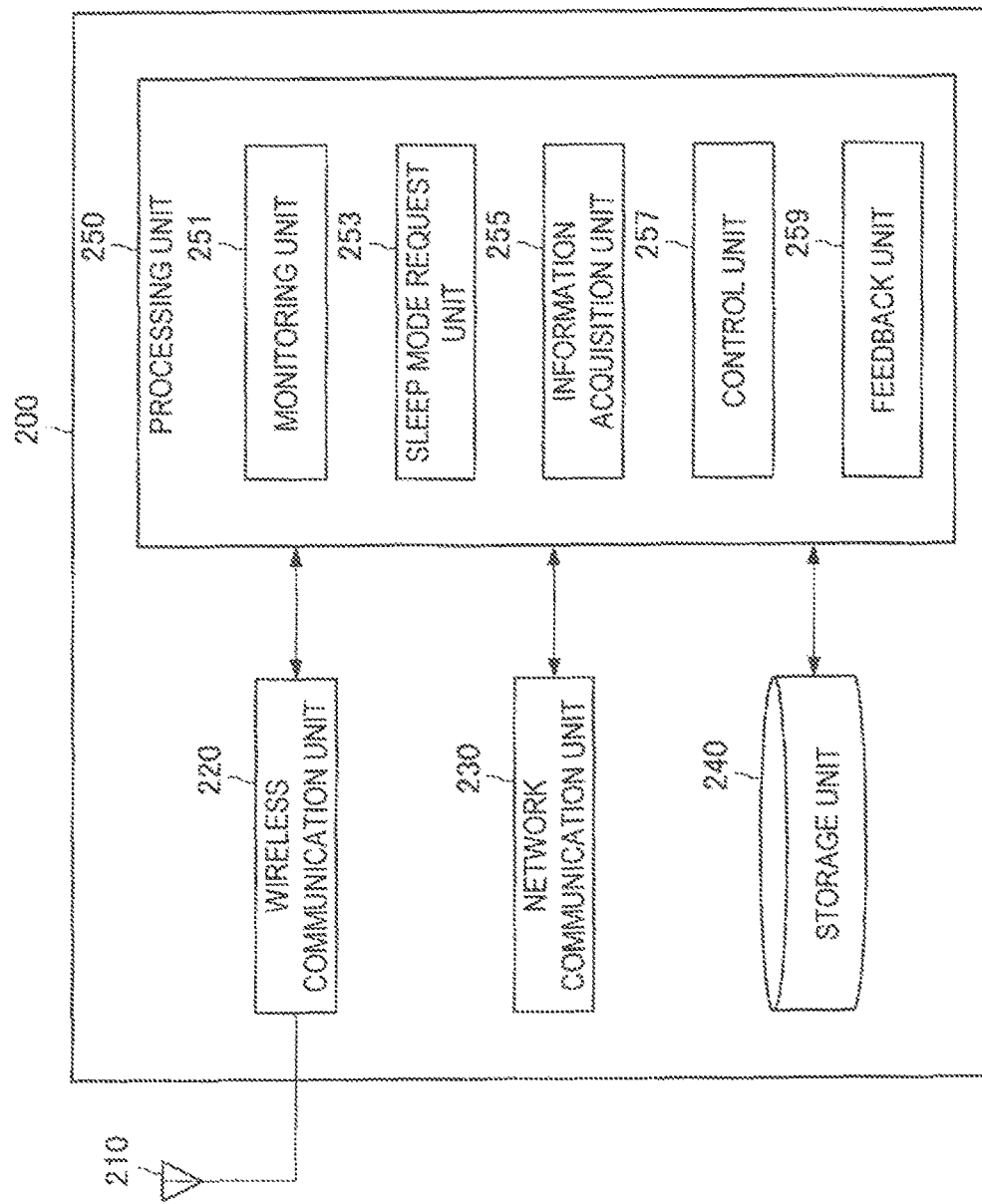
FIG. 3 is a block diagram illustrating an example of a configuration of a macro cell base station according to an embodiment of the present disclosure.

Next, an example of the configuration of the macro cell base station 200 according to an embodiment of the present disclosure will be described with reference to FIG. 3. FIG. 3 is a block diagram illustrating an example of the configuration of the macro cell base station 200 according to the second embodiment. FIG. 3 illustrates that the macro cell base station 200 includes an antenna unit 210, a wireless communication unit 220, a network unit 230, a storage unit 240, and a processing unit 250.

(Antenna Unit 210)

The antenna unit 210 emits a signal into the space as a radio wave, the signal being output by the wireless communication unit 220. The antenna unit 210 also converts a radio wave in the space into a signal, and outputs the signal to the wireless communication unit 220.

(Wireless Communication Unit 220)

The wireless communication unit 220 performs wireless communication. For example, the wireless communication unit 220 transmits a downlink signal to the terminal device 400 positioned in the macro cell 20, and receives an uplink signal from the terminal device 400 positioned in the macro cell 20.

(Network Communication Unit 230)

The network communication unit 230 communicates with another communication node. For example, the network communication unit 230 communicates with the SMM 100. For example, the network communication unit 230 communicates with another macro cell base station 200 and/or the small cell base station 300.

(Storage Unit 240)

The storage unit 240 stores a program and data for operating the macro cell base station 200.

(Processing Unit 250)

The processing unit 250 provides a variety of functions of the macro cell base station 200. The processing unit 250 includes a monitoring unit 251, a sleep mode request unit 253, an information acquisition unit 255, a control unit 257, and a feedback unit 259.

(Monitoring Unit 251)

The monitoring unit 251 does monitoring in the macro cell 20. The monitoring includes, for example, monitoring any of the traffic volume, the number of terminal devices, the interference level, and the communication quality.

For example, the monitoring unit 251 monitors the traffic volume in the macro cell 20. More specifically, for example, the monitoring unit 251 measures the downlink traffic volume and the uplink traffic volume in the macro cell 20. If the measured traffic volume falls below a predetermined threshold, the monitoring unit 251 notifies the sleep mode request unit 253 of the measured traffic volume as a monitoring result.

For example, the monitoring unit 251 monitors the number of terminal devices in the macro cell 20. More specifically, for example, the monitoring unit 251 measures the number of terminal devices 400 connected to the macro cell base station 200. If the measured number of terminal devices falls below a predetermined threshold, the monitoring unit 251 notifies the sleep mode request unit 253 of the measured number of terminal devices as a monitoring result.

For example, the monitoring unit 251 monitors the interference level in the macro cell 20. More specifically, for example, the monitoring unit 251 measures a level of the interference of a neighboring cell with the macro cell 20. If the measured level of the interference exceeds a predetermined threshold, the monitoring unit 251 notifies the sleep mode request unit 253 of the measured level of the interference as a monitoring result.

For example, the monitoring unit 251 monitors the communication quality in the macro cell 20. More specifically, for example, the monitoring unit 251 measures the communication quality (e.g. throughput) in the macro cell 20. If the measured communication quality falls below a predetermined threshold, the monitoring unit 251 notifies the sleep mode request unit 253 of the measured communication quality as a monitoring result.

(Sleep Mode Request Unit 253)

The sleep mode request unit 253 requests a sleep mode.

For example, the sleep mode request unit 253 requests a sleep mode from the SMM 100 in accordance with a result obtained by doing monitoring in the macro cell 20. More specifically, for example, notified of a monitoring result by the monitoring unit 251, the sleep mode request unit 253 makes a request of scheduling a sleep mode to the SMM 100 via the network communication unit 230.

The request includes, for example, the purpose of requesting a sleep mode and a monitoring result. For example, the power consumption, or the interference between cells is reduced as the purpose. The monitoring result is, for example, the traffic volume, the number of terminal devices, the interference level, and/or the communication quality (e.g. throughput) in the macro cell 20.

(Information Acquisition Unit 255)

Acquisition of Sleep Mode Information

Once sleep mode information is provided indicating a sleep mode selected from the plurality of sleep modes for setting a base station in the sleep state, the information acquisition unit 255 acquires the sleep mode information.

For example, the SMM 100 provides the macro cell base station 200 with scheduling information on a sleep mode which includes the sleep mode information. The information acquisition unit 255 then acquires the scheduling information, and acquires the sleep mode information included in the scheduling information.

Additionally, the scheduling information further includes, for example, parameter information (information indicating a specific range within which to set a base station in the sleep state) corresponding to the sleep mode information. The scheduling information further includes, for example, information indicating the effective period (period of effective scheduling) and/or information indicating an effective area (geographical area of effective scheduling).

Notification of Scheduling Information to Terminal Device

For example, the information acquisition unit 255 further notifies the terminal device 400 of the scheduling information on a sleep mode.

Specifically, for example, acquiring the scheduling information provided by the SMM 100, the information acquisition unit 255 generates scheduling information on a sleep mode for the terminal device 400 that wirelessly communicates with the macro cell base station 200). The information acquisition unit 255 then notifies the terminal device 400 of the generated scheduling information via the wireless communication unit 220. The terminal device 400 may be notified via a broadcast channel (such as a PBCH), or the terminal device 400 may also be individually notified via another control channel (such as a PDCCH).

For example, such a notification allows the terminal device 400 to operate on the basis of the sleep state of a base station. As an example, the terminal device 400 can exclude a base station in the sleep state from measurement targets.

Additionally, the scheduling information of which the terminal device 400 is notified may also be generated on the basis of the capability of the terminal device 400. For example, the terminal device 400 that does not support carrier aggregation does not need information on sleep in units of CCs. The scheduling information of which the terminal device 400 is notified may be thus generated to include no information on sleep in units of CCs.

(Control Unit 257)

The control unit 257 controls the operation of the macro cell base station 200 in accordance with the sleep mode.

For example, the control unit 257 makes the macro cell base station 200 operate in accordance with the sleep mode indicated by the sleep mode information included in the scheduling information. More specifically, for example, when the macro cell base station 200 is positioned in the effective area indicated by the scheduling information, the control unit 257 makes the macro cell base station 200 perform an on/off operation in accordance with the sleep mode for the effective period indicated by the scheduling information.

As an example, the sleep mode information indicates the Mode-F1 (sleep in units of CCs). In this case, the control unit 257 sets the macro cell base station 200 in the sleep state in a CC indicated by the parameter information.

As another example, the sleep mode information indicates the Mode-T5 (sleep in units of sub-frames). In this case, the control unit 257 sets the macro cell base station 200 in the sleep state in a sub-frame indicated by the parameter information.

As still another example, the sleep mode information indicates the combination of the Mode-L2 (sleep in only the downlink) and the Mode-T5 (sleep in units of sub-frames). In this case, the control unit 257 sets the macro cell base station 200 in the sleep state in a sub-frame indicated by the parameter information in the downlink.

(Feedback Unit 259)

The feedback unit 259 provides feedback information indicating a result of an evaluation of the application of the sleep mode selected for the macro cell base station 200 to the macro cell base station 200.

For example, the feedback unit 259 evaluates the application of the sleep mode to the macro cell base station 200 after the operation according to the sleep mode. The feedback unit 259 then provides feedback information indicating a result of the evaluation to the SMM 100. For example, the feedback unit 259 provides the feedback information to the SMM 100 when the result of the evaluation satisfies a predetermined condition. The result of the evaluation includes the value of the evaluation parameter.

The evaluation is made, for example, in accordance with the purpose of setting a base station in the sleep state. For example, the power consumption, or the interference between cells is reduced as the purpose.

For example, when the power consumption is reduced as the purpose, the reduction in the power consumption is evaluated as the evaluation and a result of the evaluation includes the amount of the power consumption reduced through the application of the sleep mode. When the amount of the reduced power consumption satisfies a predetermined condition (e.g. the amount of the reduced power consumption exceeds a predetermined threshold or the amount of the reduced power consumption falls below a predetermined threshold), the feedback information is provided to the SMM 100. The feedback information includes, for example, the amount of the reduced power consumption. Additionally, the feedback information may further include prerequisite information on the power consumption indicating, for example, the traffic volume and the number of terminal devices.

For example, when the interference between cells is reduced as the purpose, the reduction in the interference between cells is evaluated as the evaluation and a result of the evaluation includes the interference level and/or the communication quality (e.g. throughput) through the application of the sleep mode. When the interference level and/or the communication quality exceeds a predetermined condition (e.g. the interference level exceeds a predetermined threshold or the interference level falls below a predetermined threshold), the feedback information is provided to the SMM 100. The feedback information includes the interference level and/or the communication quality.

The evaluation may be made on the basis of information (such as the interference level or the communication quality of the terminal device 400) provided by the terminal device 400.

<<3.3. Configuration of Small Cell Base Station>>

Figure 4:
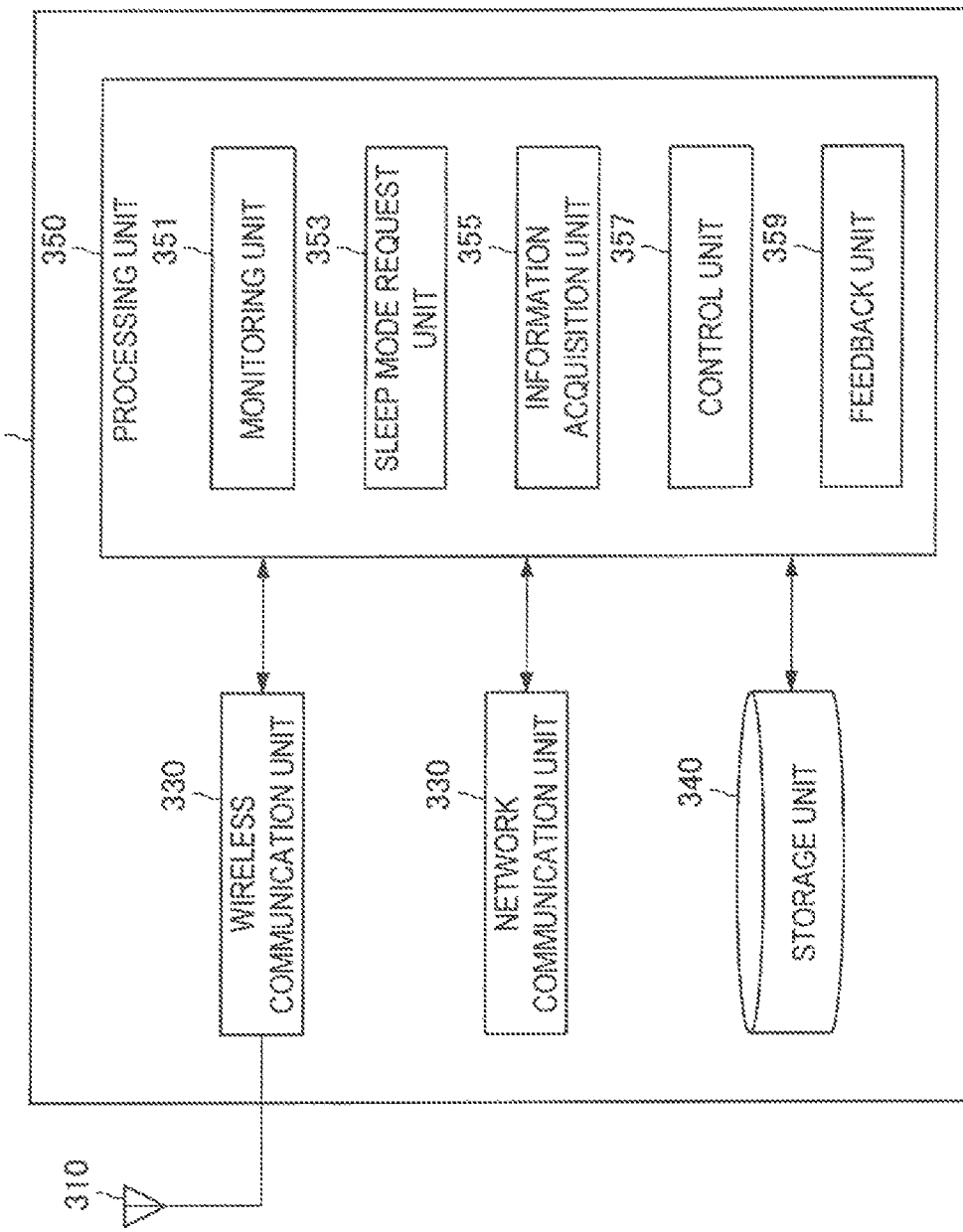
FIG. 4 is a block diagram illustrating an example of a configuration of a small cell base station according to an embodiment of the present disclosure.

Next, an example of the configuration of the small cell base station 300 according to an embodiment of the present disclosure will be described with reference to FIG. 4. FIG. 4 is a block diagram illustrating an example of the configuration of the small cell base station 300 according to an embodiment of the present disclosure. FIG. 3 illustrates that the small cell base station 300 includes an antenna unit 310, a wireless communication unit 320, a network communication unit 330, a storage unit 340, and a processing unit 350.

(Antenna Unit 310)

The antenna unit 310 emits a signal into the space as a radio wave, the signal being output by the wireless communication unit 320. The antenna unit 310 also converts a radio wave in the space into a signal, and outputs the signal to the wireless communication unit 320.

(Wireless Communication Unit 320)

The wireless communication unit 320 performs wireless communication. For example, the wireless communication unit 320 transmits a downlink signal to the terminal device 400 positioned within the small cell 30, and receives an uplink signal from the terminal device 400 positioned within the small cell 30.

(Network Communication Unit 330)

The network communication unit 330 communicates with another communication node. For example, the network communication unit 330 communicates with the SMM 100. For example, the network communication unit 330 communicates with the macro cell base station 200 and/or another small cell base station 300.

(Storage Unit 340)

The storage unit 340 stores a program and data for operating the small cell base station 300.

(Processing Unit 350)

The processing unit 350 provides a variety of functions of the small cell base station 300. The processing unit 350 includes a monitoring unit 351, a sleep mode request unit 353, an information acquisition unit 355, a control unit 357, and a feedback unit 359.

Additionally, the monitoring unit 351, the sleep mode request unit 353, the information acquisition unit 355, the control unit 357, and the feedback unit 359 respectively operate similarly to the monitoring unit 251, the sleep mode request unit 253, the information acquisition unit 255, the control unit 257, and the feedback unit 259 of the macro cell base station 200.

<<3.4. Configuration of Terminal Device>>

Figure 5:
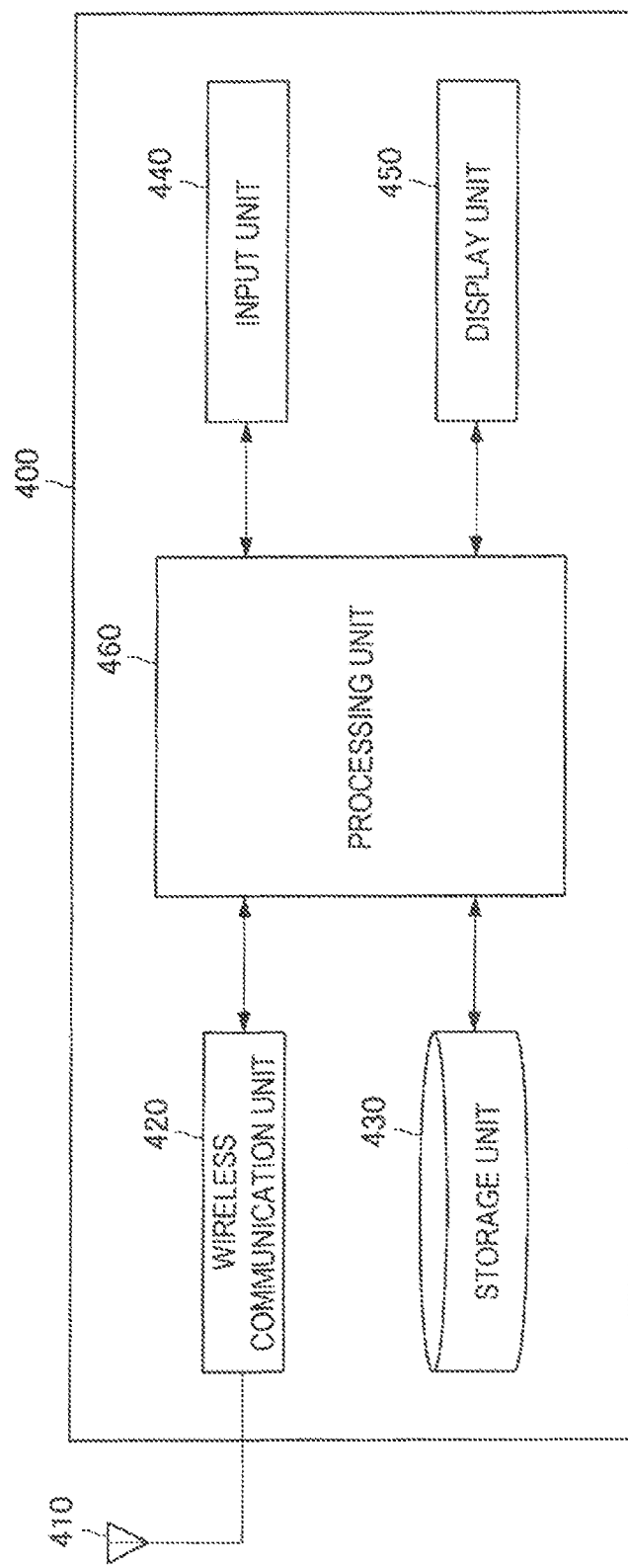
FIG. 5 is a block diagram illustrating an example of a configuration of a terminal device according to an embodiment of the present disclosure.

Next, an example of the configuration of the terminal device 400 according to an embodiment of the present disclosure will be described with reference to FIG. 5. FIG. 5 is a block diagram illustrating the example of the configuration of the terminal device 400 according to an embodiment of the present disclosure. FIG. 5 illustrates that the terminal device 400 includes an antenna unit 410, a wireless communication unit 420, a storage unit 430, an input unit 440, a display unit 450, and a processing unit 460.

(Antenna Unit 410)

The antenna unit 410 emits a signal into the space as a radio wave, the signal being output by the wireless communication unit 420. The antenna unit 410 also converts a radio wave in the space into a signal, and outputs the signal to the wireless communication unit 420.

(Wireless Communication Unit 420)

The wireless communication unit 420 performs wireless communication. For example, the wireless communication unit 420 receives a downlink signal from the macro cell base station 200 and transmits an uplink signal to the macro cell base station 200 when the terminal device 400 is positioned within the macro cell 20. For example, the wireless communication unit 420 receives a downlink signal from the small cell base station 300 and transmits an uplink signal to the small cell base station 300 when the terminal device 400 is positioned within the small cell 30.

(Storage Unit 430)

The storage unit 420 stores a program and data for the operation of the terminal device 400.

(Input Unit 440)

The input unit 440 receives an input from a user of the terminal device 400. The input unit 440 then provides a result of the input to the processing unit 460.

(Display Unit 450)

The display unit 450 displays a screen that a user of the terminal device 400 watches. The display unit 450 displays the screen, for example, in accordance with the control of the processing unit 460.

(Processing Unit 460)

The processing unit 460 provides a variety of functions of the terminal device 400.

For example, a base station (such as the macro cell base station 200 or the small cell base station 300) provides the terminal device 400 with scheduling information on a sleep mode. The processing unit 460 then acquires the scheduling information. The processing unit 460 controls the operation of the terminal device 400 on the basis of the sleep state of the base station. As an example, the terminal unit 400 excludes a base station in the sleep state from measurement targets.

4. FLOW OF PROCESSING

Next, an example of communication control processing according to an embodiment of the present disclosure will be described with reference to FIGS. 6 to 11.

(Entire Processing)

Figure 6:
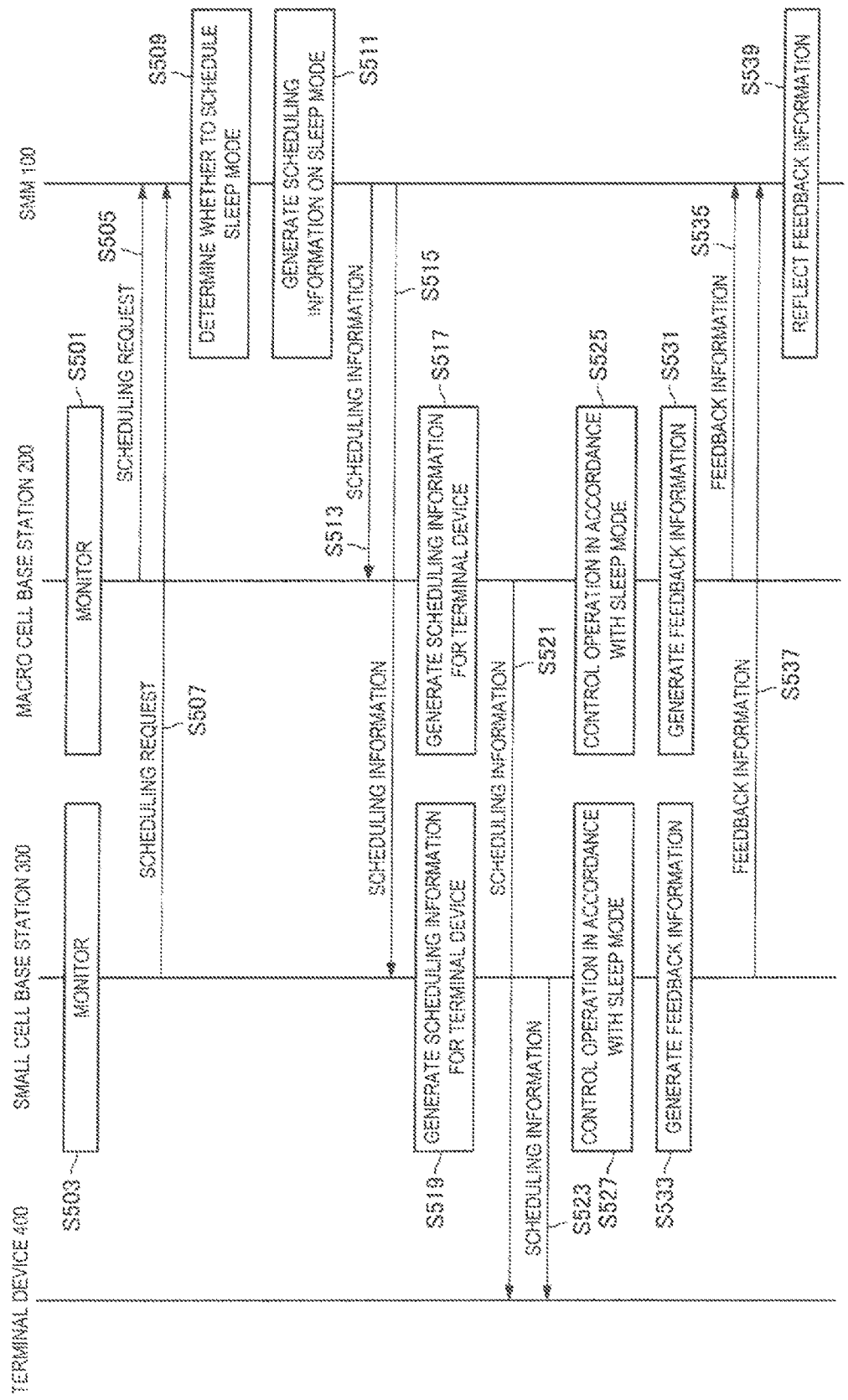
FIG. 6 is a sequence diagram illustrating an example of a schematic flow of entire communication control processing according to an embodiment of the present disclosure.

FIG. 6 is a sequence diagram illustrating an example of a schematic flow of the entire communication control processing according to an embodiment of the present disclosure.

The macro cell base station 200 does monitoring in the macro cell 20 (S501), and the small cell base station 300 does monitoring in the small cell 30 (S503). The macro cell base station 200 and the small cell base station 300 then request the SMM 100 to schedule a sleep mode (S505 and S507).

The SMM 100 determines whether to schedule a sleep mode (S509). For example, if it is determined that the scheduling is to be performed, the SMM 100 generates scheduling information on a sleep mode (S511). The SMM 100 then provides the scheduling information to the macro cell base station 200 and the small cell base station 300 (S513 and S515).

The macro cell base station 200 and the small cell base station 300 generate scheduling information for a terminal device (S517 and S519), and notify the terminal device 400 (S521 and S523). The macro cell base station 200 and the small cell base station 300 operate the macro cell base station 200 in accordance with a sleep mode indicated by the sleep mode information in the scheduling information provided by the SMM 100 (S525 and S527).

Thereafter, the macro cell base station 200 and the small cell base station 300 generate feedback information indicating a result of an evaluation of the application of the sleep mode (S531 and S533), and provide the feedback information to the SMM 100 (S535 and S537).

Thereafter, the SMM 100 acquires the feedback information, and reflects the acquired feedback information to decide a specific range within which to set a base station in the sleep state and to select a sleep mode (S539).

(First Processing on Base Station Side: Monitoring and Request of Sleep Mode)

Figure 7:
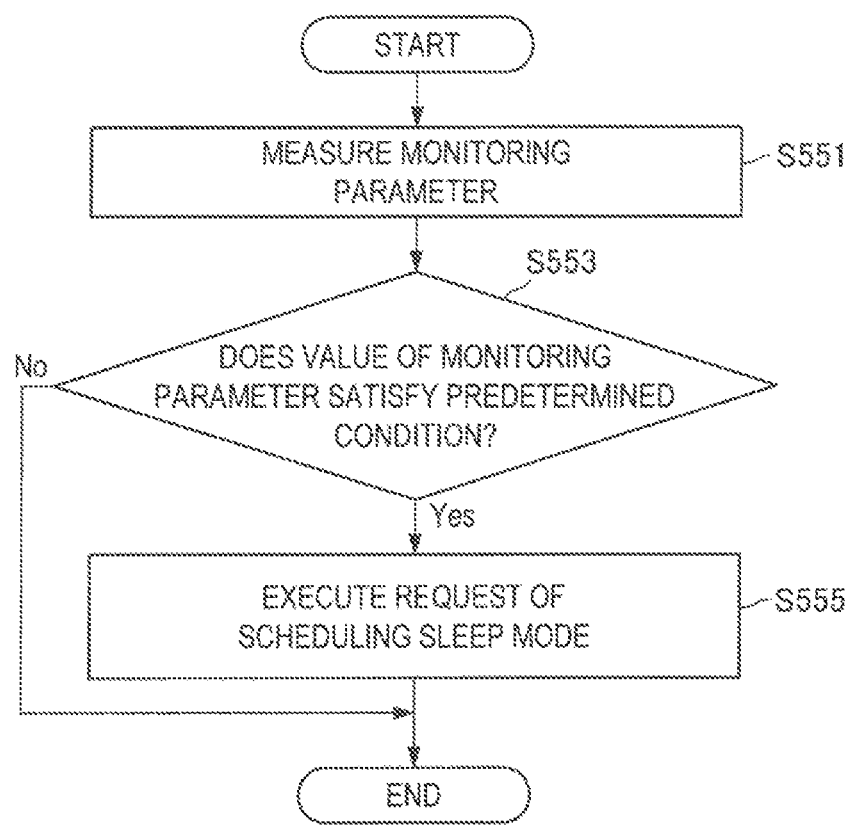
FIG. 7 is a flowchart illustrating an example of a schematic flow of first communication control processing on a base station side according to an embodiment of the present disclosure.

FIG. 7 is a flowchart illustrating an example of a schematic flow of first communication control processing on the base station side according to an embodiment of the present disclosure. The first communication control processing on the base station side is processing of doing monitoring and requesting a sleep mode, and corresponds to steps S501 and S505, or steps S503 and S507 of the communication control processing described with reference to FIG. 6. The following describes an example in which the macro cell base station 200 executes the first communication control processing on the base station side, but the small cell base station 300 may also execute the first communication control processing on the base station side.

First of all, the monitoring unit 251 measures a monitoring parameter (such as the traffic volume, the number of terminal devices, the interference level and/or the communication quality) (551). The monitoring unit 251 then determines whether or not the value of the monitoring parameter satisfies a predetermined condition (e.g. whether or not the value of the monitoring parameter exceeds a predetermined value or whether or not the value of the monitoring parameter falls below a predetermined threshold) (S553).

If the value of the monitoring parameter satisfies the predetermined value (S553: Yes), the monitoring unit 251 notifies the sleep mode request unit 253 of the value of the monitoring parameter and the sleep mode request unit 253 requests the SMM 100 to schedule a sleep mode (S555). The processing then terminates.

Conversely, if the monitoring parameter does not satisfy the predetermined condition (S553: No), the processing terminates.

(First Processing on SMM Side: Determination of Scheduling)

Figure 8:
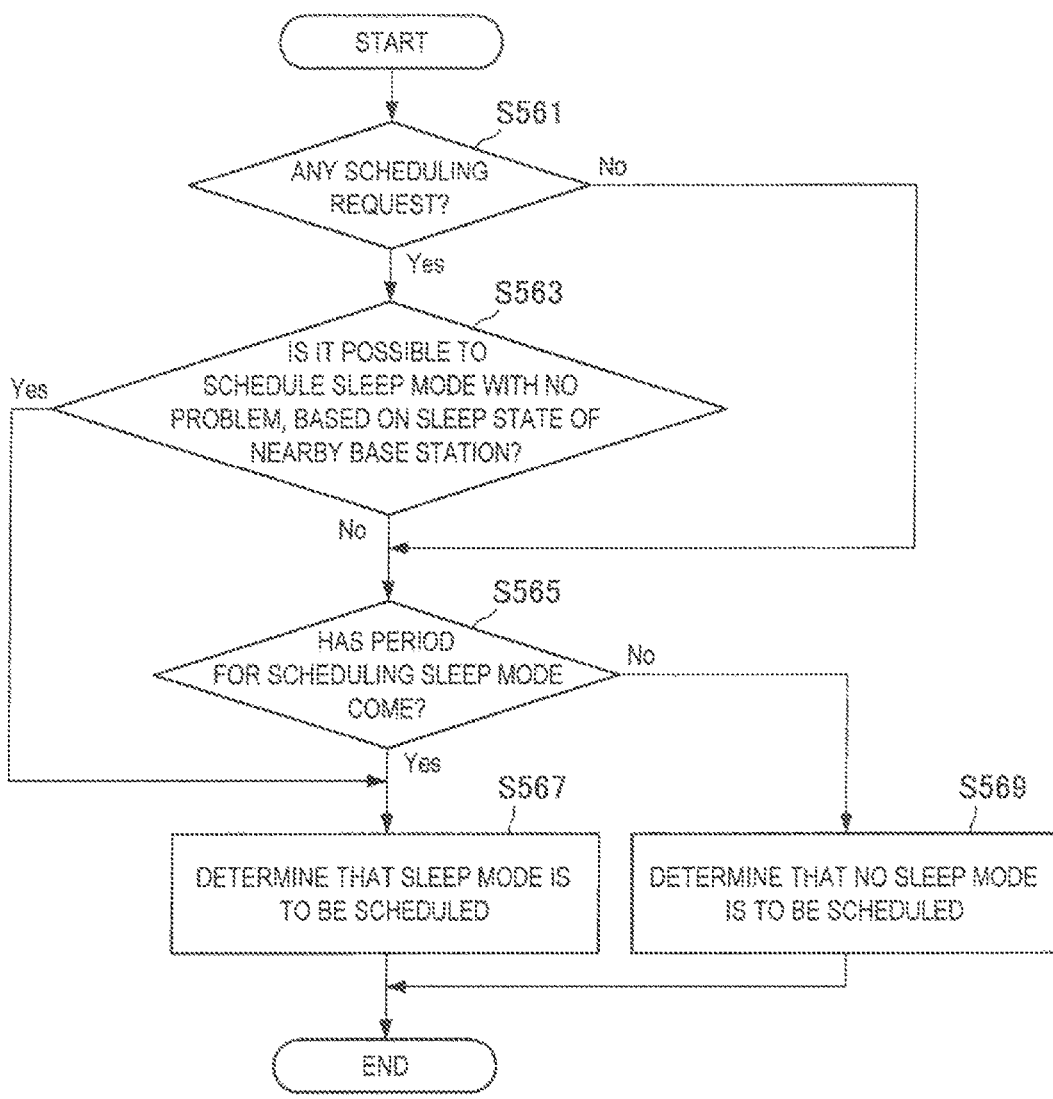
FIG. 8 is a flowchart illustrating an example of a schematic flow of first communication control processing on an SMM side according to an embodiment of the present disclosure.

FIG. 8 is a flowchart illustrating an example of a schematic flow of first communication control processing on the SMM side according to an embodiment of the present disclosure. The first communication control processing on the SMM side is processing of determining whether to schedule a sleep mode, and corresponds to step S509 of the communication control processing described with reference to FIG. 6.

First of all, the sleep mode application unit 133 determines whether or not a base station has made a scheduling request (S561).

If the scheduling request has been made (S561: Yes), the sleep mode application unit 133 determines whether or not it is possible to schedule a sleep mode with no problem, on the basis of the sleep state of a nearby base station of the base station that has made the scheduling request (S563).

If it is possible to perform the scheduling with no problem (S563: Yes), the sleep mode application unit 133 determines that a sleep mode is to be scheduled (S567). The processing then terminates.

Conversely, if the scheduling request has not been made (S561: No), or if it is not possible to perform the scheduling with no problem (S563: No), the sleep mode application unit 133 determines whether or not a period for scheduling a sleep mode has come (S565).

If the period has come (S565: Yes), the sleep mode application unit 133 determines that a sleep mode is to be scheduled (S567). The processing then terminates.

Conversely, if the period has not come (S565: No), the sleep mode application unit 133 determines that no sleep mode is to be scheduled (S569). The processing then terminates.

(Second Processing on Base Station Side: Control Over Operation According to Sleep Mode)

Figure 9:
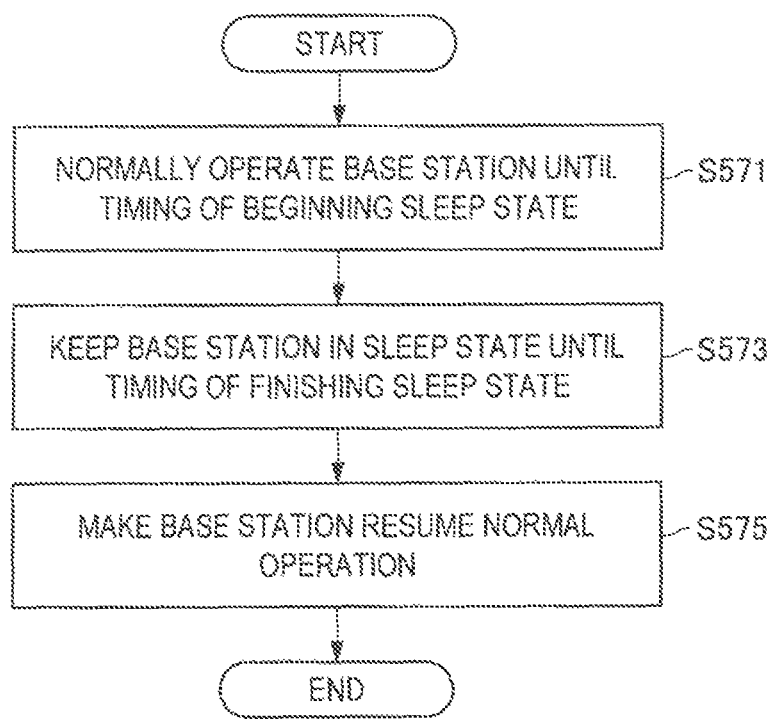
FIG. 9 is a flowchart illustrating an example of a schematic flow of second communication control processing on a base station side according to an embodiment of the present disclosure.

FIG. 9 is a flowchart illustrating an example of a schematic flow of second communication control processing on the base station side according to an embodiment of the present disclosure. The second communication control processing on the base station side is processing of controlling the operation according to a sleep mode, and corresponds to step S525 or S527 of the communication control processing described with reference to FIG. 6. The following describes an example in which the macro cell base station 200 executes the second communication control processing on the base station side, but the small cell base station 300 may also execute the second communication control processing on the base station side.

The control unit 257 normally operates the macro cell base station 200 until timing of beginning the sleep state (S571).

The control unit 257 then keeps the macro cell base station 200 in a sleep mode state from the beginning timing to timing of finishing the sleep mode (S573).

Thereafter, the control unit 257 makes the macro cell base station 200 resume a normal operation (S575). The processing then terminates.

(Third Processing on Base Station Side: Feedback)

Figure 10:
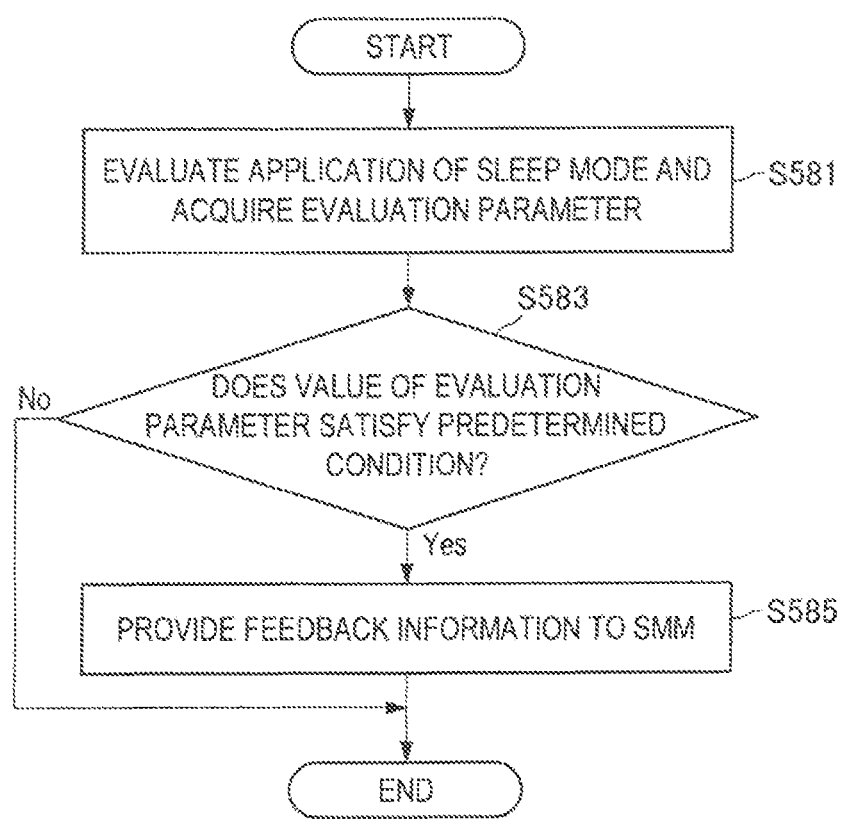
FIG. 10 is a flowchart illustrating an example of a schematic flow of third communication control processing on a base station side according to an embodiment of the present disclosure.

FIG. 10 is a flowchart illustrating an example of a schematic flow of third communication control processing on the base station side according to an embodiment of the present disclosure. The third communication control processing on the base station side is processing of yielding feedback, and corresponds to steps S531 and S535, or steps S533 and S537 of the communication control processing described with reference to FIG. 6. The following describes an example in which the macro cell base station 200 executes the third communication control processing on the base station side, but the small cell base station 300 may also execute the third communication control processing on the base station side.

The feedback unit 259 evaluates the application of a sleep mode to the macro cell base station 200, and acquires an evaluation parameter (such as the amount of the power consumption reduced through the application of the sleep mode or the interference level through the application of the sleep mode) (S581). The feedback unit 259 then determines whether or not the value of the evaluation parameter satisfies a predetermined condition (e.g. whether or not the value of the evaluation parameter exceeds a predetermined value or whether or not the value of the evaluation parameter falls below a predetermined threshold) (S583).

If the value of the evaluation parameter satisfies the predetermined condition (S583: Yes), the feedback unit 259 then provides feedback information indicating a result of the evaluation to the SMM 100 (S585). The processing then terminates.

Conversely, if the evaluation parameter does not satisfy the predetermined condition (S583: No), the processing terminates.

(Second Processing on SMM Side: Feedback)

Figure 11:
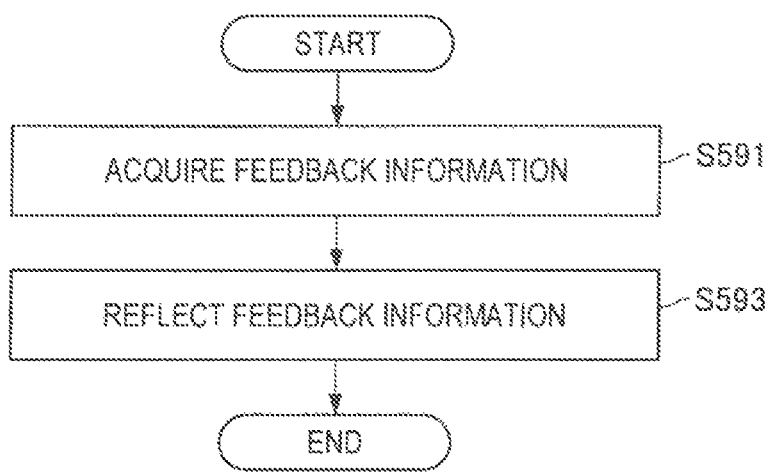
FIG. 11 is a flowchart illustrating an example of a schematic flow of second communication control processing on an SMM side according to an embodiment of the present disclosure.

FIG. 11 is a flowchart illustrating an example of a schematic flow of second communication control processing on the SMM side according to an embodiment of the present disclosure. The second communication control processing on the SMM side is processing of yielding feedback, and corresponds to step S539 of the communication control processing described with reference to FIG. 6.

The feedback acquisition unit 135 acquires feedback information indicating a result of an evaluation of the application of a sleep mode selected for a target base station to the target base station (S591).

The feedback acquisition unit 135 then reflects the feedback information, for example, to decide a specific range within which to set a base station in the sleep state and to select a sleep mode (S593). The processing then terminates.

5. APPLICATION EXAMPLES

The technology according to the present disclosure is applicable to a variety of products. The SMM 100 may be implemented as any type of server such as tower servers, rack servers, or blade servers. The SMM 100 may be a control module (e.g. integrated circuit module that includes a single die, or card or blade that is inserted into a slot of a blade server) mounted on a server.

For example, the macro cell base station 200 and the small cell base station 300 may be implemented as any type of evolved Node B (eNB). As a specific example, the macro cell base station 200 may be implemented as a macro eNB, while the small cell base station 300 may be implemented as a small eNB. Small eNBs may be, for example, pico eNBs, micro eNBs, or home (femto) eNBs that cover smaller cells than the macro cells. Instead, the macro base station 200 and the small cell base station 300 may be implemented as another type of base station such as eNodeBs or base transceiver stations (BTSs). The macro cell base station 200 and the small cell base station 300 may include the main device (which is also referred to as base station device) that controls wireless communication and one or more remote radio heads (RRHs) that are arranged at different places from that of the main device. Various types of terminal devices as discussed later may temporarily or semi-persistently execute the base station function to function as the macro cell base station 200 or the small cell base station 300.

The terminal device 400 may be implemented as a mobile terminal such as a smartphone, a tablet personal computer (PC), a notebook PC, a portable game terminal, a portable/dongle mobile muter, or a digital camera, or an in-vehicle terminal such as a car navigation device. The terminal device 400 may also be implemented as a terminal (which is also referred to as machine type communication (MTC) terminal) that performs machine to machine (M2M) communication. Furthermore, the terminal device 400 may be a wireless communication module (e.g. integrated circuit module including a single die) that is mounted on these kinds of terminal.

<5.1. Application Example for Sleep Mode Manager (SMM)>

Figure 12:
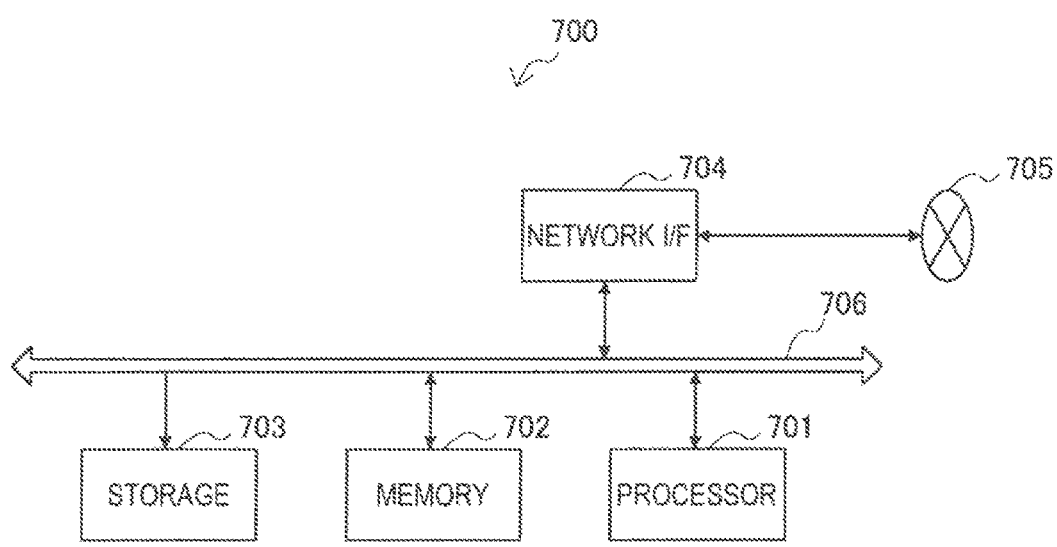
FIG. 12 is a block diagram illustrating an example of a schematic configuration of a server to which the technology according to the present disclosure may be applied.

FIG. 12 is a block diagram illustrating an example of a schematic configuration of a server 700 to which the technology according to the present disclosure may be applied. The server 700 includes a processor 701, memory 702, a storage 703, a network interface 704, and a bus 706.

The processor 701 may be, for example, a central processing unit (CPU) or a digital signal processor (DSP), and controls various functions of the server 700. The memory 702 includes random access memory (RAM) and read only memory (ROM), and stores a program executed by the processor 701 and data. The storage 703 may include a storage medium such semiconductor memory and hard disks.

The network interface 704 is a wired communication interface for connecting the server 700 to a wired communication network 705. The wired communication network 705 may be a core network such as evolved packet cores (EPCs), or a packet data network (PDN) such as the Internet.

The bus 706 connects the processor 701, the memory 702, the storage 703, and the network interface 704 to each other. The bus 706 may include two or more buses each having different speed (e.g. high speed bus and low speed bus).

The sleep mode information acquisition unit 131, the sleep mode application unit 133, and the feedback acquisition unit 135 described with reference to FIG. 2 may be implemented by the processor 701 in the server 700 illustrated in FIG. 12.

<5.2. Application Example for Base Station>

First Application Example

Figure 13:
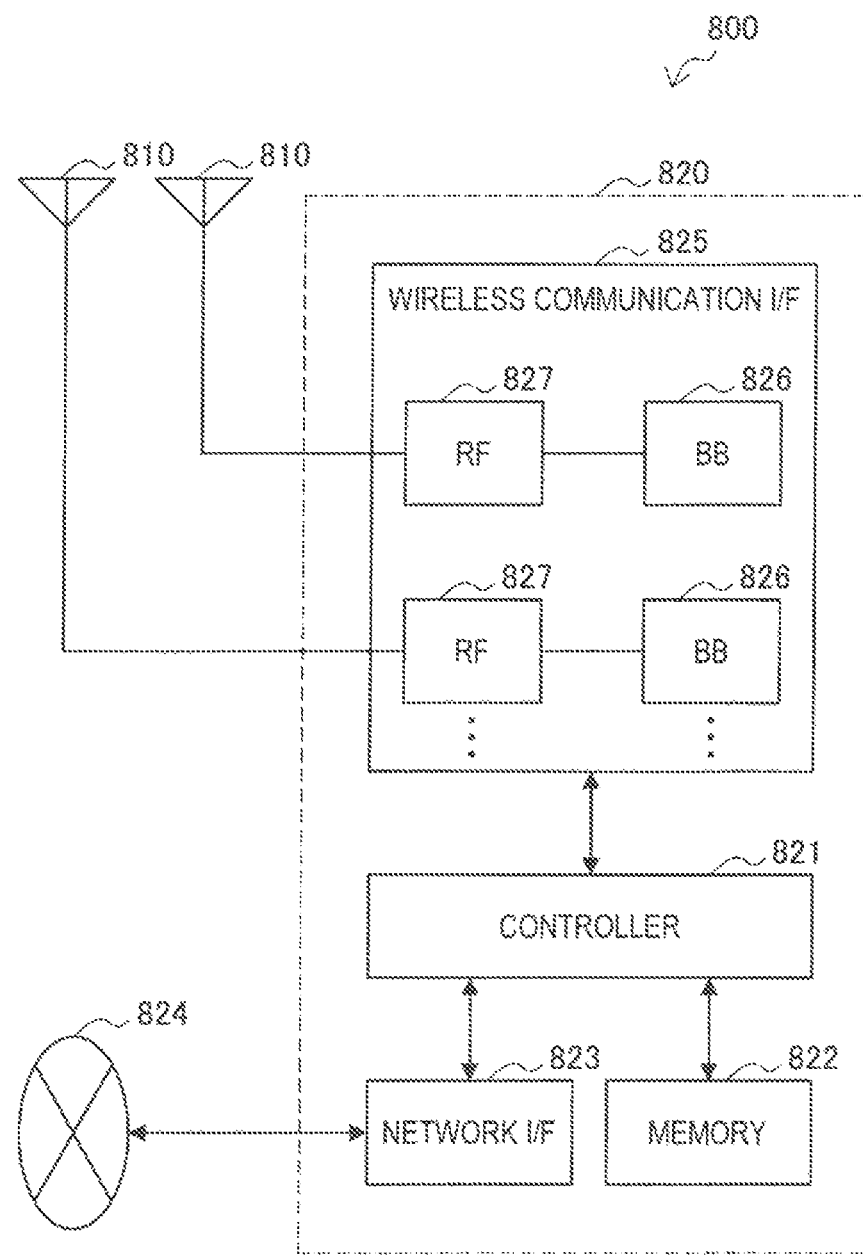
FIG. 13 is a block diagram illustrating a first example of a schematic configuration of an eNB to which the technology according to the present disclosure may be applied.

FIG. 13 is a block diagram illustrating a first example of a schematic configuration of an eNB to which the technology according to the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (e.g. antenna elements included in a MIMO antenna) and is used for the base station device 820 to transmit and receive a wireless signal. The eNB 800 may include the plurality of the antennas 810 as illustrated in FIG. 13, and the plurality of antennas 810 may, for example, correspond to a plurality of frequency bands used by the eNB 800. FIG. 13 illustrates an example in which the eNB 800 includes the plurality of antennas 810, but the eNB 800 may include the single antenna 810.

The base station device 820 includes a controller 821, memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, or scheduling. The control may be performed in cooperation with a surrounding eNB or a core network. The memory 822 includes RAM and ROM, and stores a program executed by the controller 821 and a variety of control data (e.g. terminal list, transmission power data, and scheduling data).

The network interface 823 is a communication interface for connecting the base station device 820 to the core network 824. The controller 821 may communicate with a core network node or another eNB via the network interface 823. In this case, the controller 821 may be mutually connected to the eNB 800 and a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band fir wireless communication than a frequency band used by the wireless communication interface 825.

The wireless communication interface 825 supports a cellular communication system such as long term evolution (LTE) or LTE-Advanced, and provides a wireless connection to a terminal positioned within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have a part or all of the logical functions as discussed above instead of the controller 821. The BB processor 826 may be a module including memory having a communication control program stored therein, a processor to execute the program, and a related circuit, and the function of the BB processor 826 may be changeable by updating the program. The module may be a card or blade to be inserted into a slot of the base station device 820, or a chip mounted on the card or the blade. Meanwhile, the RF circuit 827 may include a mixer, a filter, an amplifier, and the like, and transmits and receives a radio signal via the antenna 810.

The wireless communication interface 825 may include a plurality of the BB processors 826 as illustrated in FIG. 13, and the plurality of BB processors 826 may, for example, correspond to a plurality of frequency bands used by the eNB 800. The wireless communication interface 825 also may include a plurality of the RF circuits 827, as illustrated in FIG. 13, and the plurality of RF circuits 827 may, for example, correspond to a plurality of antenna elements. FIG. 13 illustrates an example in which the wireless communication interface 825 includes the plurality of BB processors 826 and the plurality of RF circuits 827, but the wireless communication interface 825 may include the single BB processor 826 or the single RF circuit 827.

Second Application Example

Figure 14:
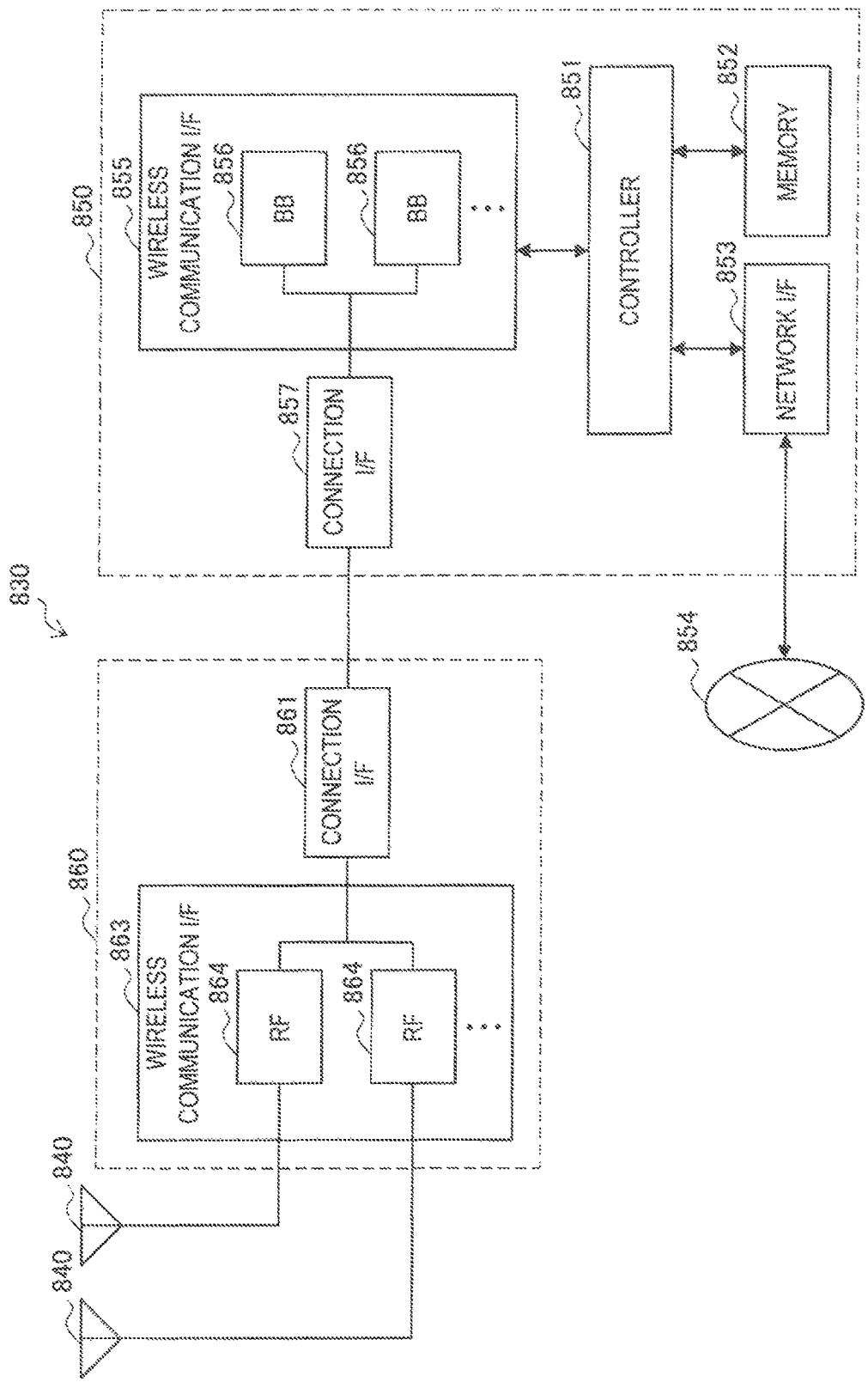
FIG. 14 is a block diagram illustrating a second example of the schematic configuration of the eNB to which the technology according to the present disclosure may be applied.

FIG. 14 is a block diagram illustrating a second example of a schematic configuration of an eNB to which the technology according to the present disclosure may be applied. An eNB 830 includes one or more antennas 840, a base station device 850, and an RRH 860. Each of the antennas 840 and the RRH 860 may be connected to each other via an RF cable. The base station device 850 and the RRH 860 may be connected to each other by a high speed line such as optical fiber cables.

Each of the antennas 840 includes a single or a plurality of antenna elements (e.g. antenna elements included in a MIMO antenna), and is used for the RRH 860 to transmit and receive a wireless signal. The eNB 830 may include a plurality of the antennas 840 as illustrated in FIG. 14, and the plurality of antennas 840 may, for example, correspond to a plurality of frequency bands used by the eNB 830. FIG. 14 illustrates an example in which the eNB 830 includes the plurality of antennas 840, but the eNB 830 may include the single antenna 840.

The base station device 850 includes a controller 851, memory 852, a network interface 853, a wireless communication interface 855, and a connection interface 857. The controller 851, the memory 852, and the network interface 853 are the same as the controller 821, the memory 822, and the network interface 823 described with reference to FIG. 13.

The wireless communication interface 855 supports a cellular communication system such as LTE or LTE-Advanced, and provides a wireless connection to a terminal positioned in a sector corresponding to the RRH 860 via the RRH 860 and the antenna 840. The wireless communication interface 855 may typically include a BB processor 856. The BB processor 856 is the same as the BB processor 826 described with reference to FIG. 13 except that the BB processor 856 is connected to an RF circuit 864 of the RRH 860 via the connection interface 857. The wireless communication interface 855 may include a plurality of the BB processors 856, as illustrated in FIG. 14, and the plurality of BB processors 856 may, for example, correspond to a plurality of frequency bands used by the eNB 830 respectively. FIG. 14 illustrates an example in which the wireless communication interface 855 includes the plurality of BB processors 856, but the wireless communication interface 855 may include the single BB processor 856.

The connection interface 857 connects the base station device 850 (wireless communication interface 855) to the RRH 860. The connection interface 857 may be a communication module for communication on the high speed line which connects the base station device 850 (wireless communication interface 855) to the RRH 860.

The RRH 860 includes a connection interface 861 and a wireless communication interface 863.

The connection interface 861 connects the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of the RF circuits 864 as illustrated in FIG. 14, and the plurality of RF circuits 864 may, for example, correspond to a plurality of antenna elements. FIG. 14 illustrates an example in which the wireless communication interface 863 includes the plurality of RF circuits 864, but the wireless communication interface 863 may include the single RF circuit 864.

The monitoring unit 251, the sleep mode request unit 253, the information acquisition unit 255, the control unit 257 and the feedback unit 259 described with reference to FIG. 3, and the monitoring unit 351, the sleep mode request unit 353, the information acquisition unit 355, the control unit 357 and the feedback unit 359 described with reference to FIG. 4 may be implemented by the wireless communication interface 825, and the wireless communication interface 855 and/or the wireless communication interface 863 in the eNB 800 and the eNB 830 illustrated in FIGS. 13 and 14. At least a part of these functions may be implemented by the controller 821 and the controller 851.

<5.3. Application Example for Terminal Device>

First Application Example

Figure 15:
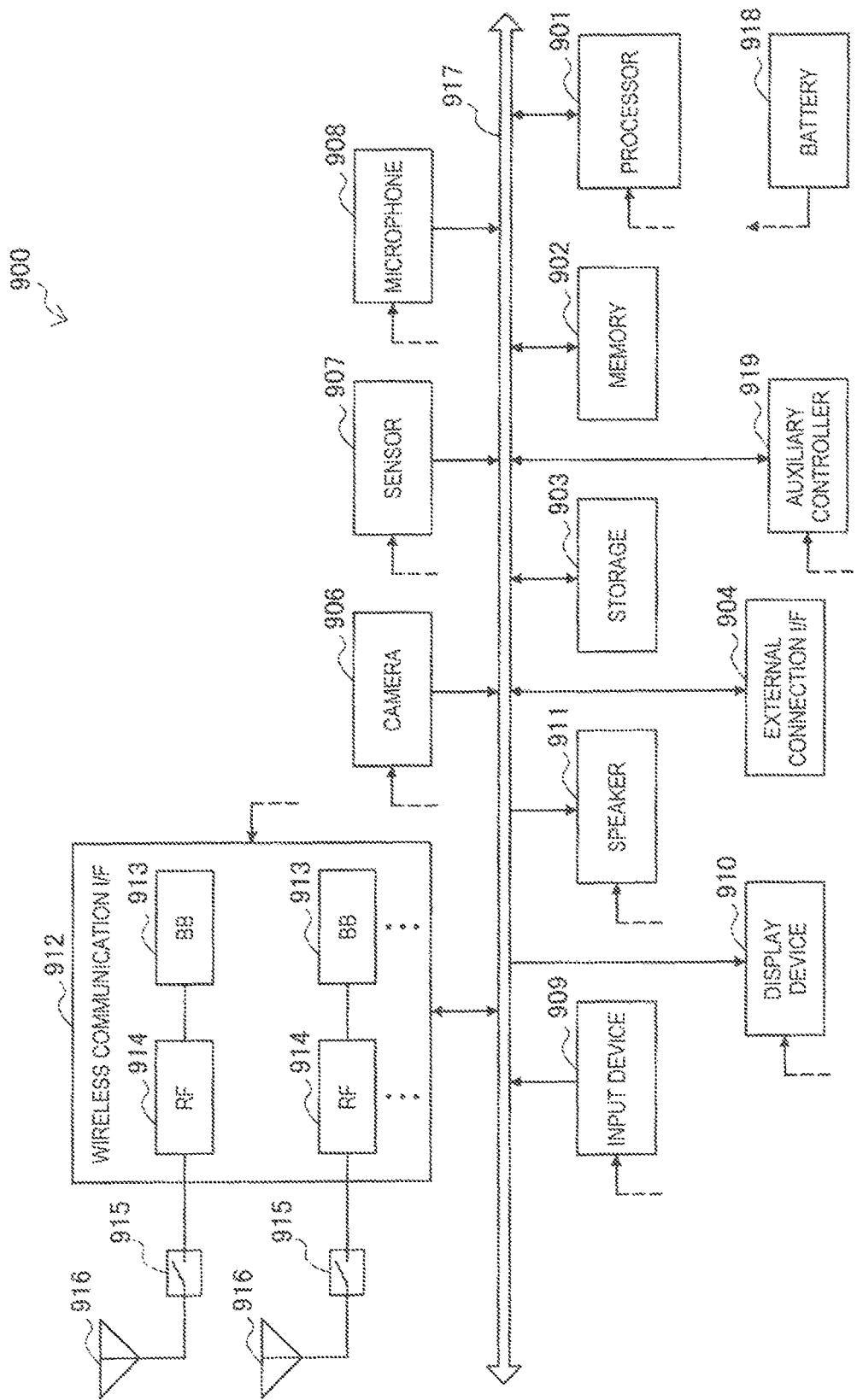
FIG. 15 is a block diagram illustrating an example of a schematic configuration of a smartphone to which the technology according to the present disclosure may be applied.

FIG. 15 is a block diagram illustrating an example of a schematic configuration of a smartphone 900 to which the technology according to the present disclosure may be applied. The smartphone 900 includes a processor 901, memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and another layer of the smartphone 900. The memory 902 includes RAM and ROM, and stores a program executed by the processor 901 and data. The storage 903 may include a storage medium such as semiconductor memory or a hard disk. The external connection interface 904 connects the smartphone 900 to an externally attached device such as a memory card or a universal serial bus (USB) device.

The camera 906 includes an image sensor such as a charge coupled device (CCD) or complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and receives an operation or an information input from a user. The display device 910 includes a screen such as a liquid crystal display (LCD) or an organic light emitting diode (OLED) display, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include a BB processor 913 and an RF circuit 914. The BB processor 913 may, for example, perform encoding/decoding, modulation/demodulation, multiplexing/demultiplexing, and the like, and executes a variety of signal processing for wireless communication. Meanwhile, the RF circuit 914 may include a mixer, a filter, and an amplifier, and transmits and receives a wireless signal via the antenna 916. The wireless communication interface 912 may be a one-chip module having the BB processor 913 and the RF circuit 914 integrated thereon. The wireless communication interface 912 may include a plurality of BB processors 913 and a plurality of RF circuits 914 as illustrated in FIG. 15. FIG. 15 illustrates an example in which the wireless communication interface 912 includes the plurality of BB processors 913 and the plurality of RF circuits 914, but the wireless communication interface 912 may also include the single BB processor 913 or the single RF circuit 914.

Furthermore, the wireless communication interface 912 may support another type of wireless communication scheme such as short-distance wireless communication schemes, near field communication schemes or wireless local area network (LAN) scheme in addition to cellular communication systems, and in that case, the wireless communication interface 912 may include a BB processor 913 and an RF circuit 914 for each wireless communication scheme.

Each of the antenna switches 915 switches a plurality of circuits (e.g. circuits for different wireless communication schemes) included in the wireless communication interface 912 to which the antennas 916 connect.

Each of the antennas 916 includes a single or a plurality of antenna elements (e.g. antenna elements included in an MIMO antenna), and is used for the wireless communication interface 912 to transmit and receive a wireless signal. The smartphone 900 may include the plurality of antennas 916 as illustrated in FIG. 15. FIG. 15 illustrates an example in which the smartphone 900 includes the plurality of antennas 916, but the smartphone 900 may also include the single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 15 via a feeder line that is partially illustrated in the figure as a dashed line. The auxiliary controller 919, for example, operates a minimally necessary function of the smartphone 900 in a sleep mode.

The processing unit 460 described with reference to FIG. 5 may be implemented by the wireless communication interface 912 in the smartphone 900 illustrated in FIG. 15. At least a part of these functions may be implemented by the processor 901 or the auxiliary controller 919.

Second Application Example

Figure 16:
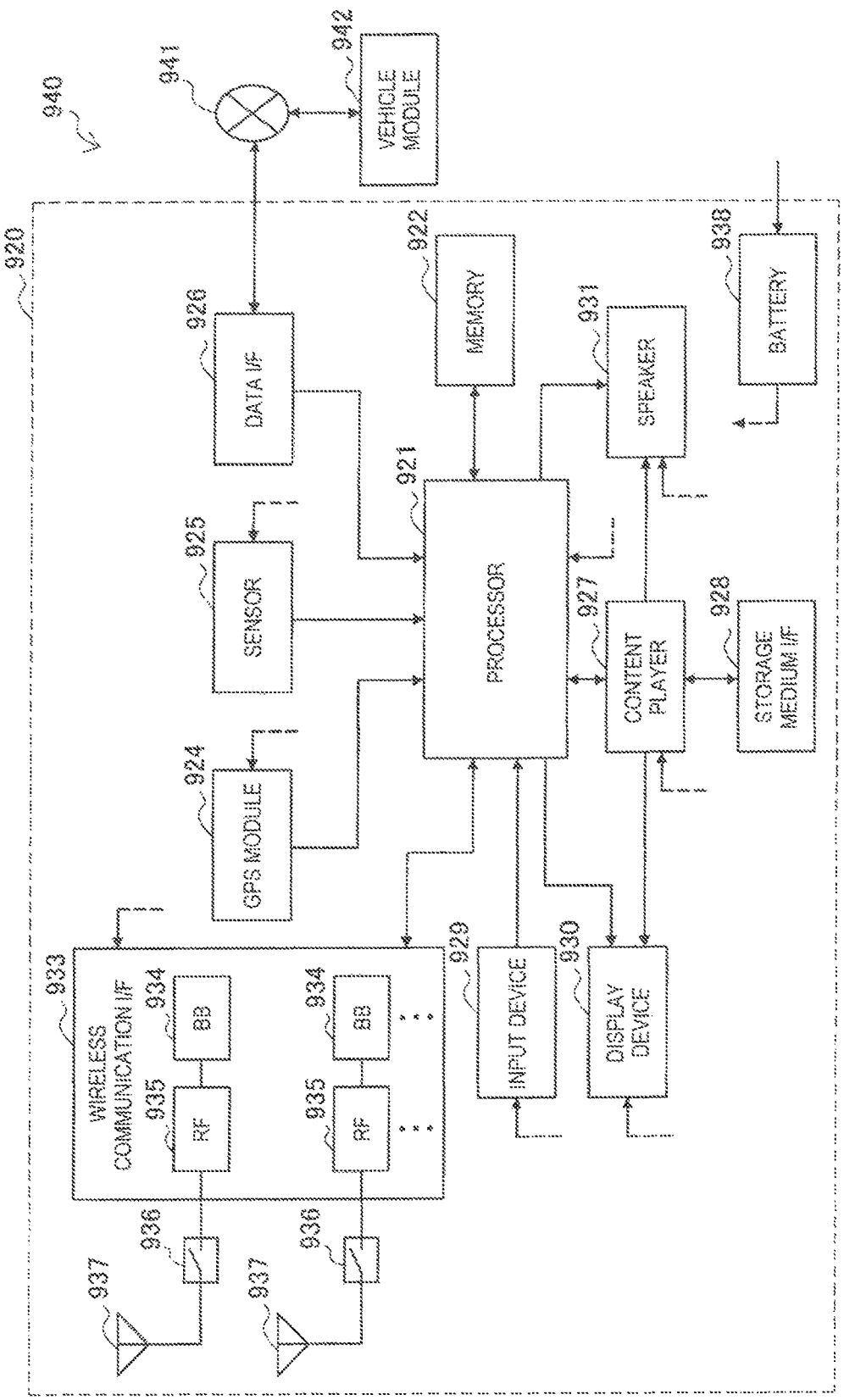
FIG. 16 is a block diagram illustrating an example of a schematic configuration of a car navigation device to which the technology according to the present disclosure may be applied.

FIG. 16 is a block diagram illustrating an example of a schematic configuration of a car navigation device 920 to which the technology according to the present disclosure may be applied. The car navigation device 920 includes a processor 921, memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation device 920. The memory 922 includes RAM and ROM, and stores a program executed by the processor 921 and data.

The GPS module 924 uses a GPS signal received from a GPS satellite to measure the position (e.g. latitude, longitude, and altitude) of the car navigation device 920. The sensor 925 may include a sensor group including, for example, a gyro sensor, a geomagnetic sensor, and an air pressure sensor. The data interface 926 is, for example, connected to an in-vehicle network 941 via a terminal that is not shown, and acquires data such as car speed data generated on the vehicle.

The content player 927 reproduces content stored in a storage medium (e.g. CD or DVD) inserted into the storage medium interface 928. The input device 929 includes, for example, a touch sensor which detects that a screen of the display device 930 is touched, a button, or a switch, and receives an operation or an information input from a user. The display device 930 includes a screen such as an LCD or an OLED display, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include a BB processor 934 and an RF circuit 935. The BB processor 934 may, for example, perform encoding/decoding, modulation/demodulation, multiplexing/demultiplexing, and the like, and executes a variety of signal processing for wireless communication. Meanwhile, the RF circuit 935 may include a mixer, a filter, and an amplifier, and transmits and receives a wireless signal via the antenna 937. The wireless communication interface 933 may be a one-chip module having the BB processor 934 and the RF circuit 935 integrated thereon. The wireless communication interface 933 may include a plurality of BB processors 934 and a plurality of RF circuits 935 as illustrated in FIG. 16. FIG. 16 illustrates an example in which the wireless communication interface 933 includes the plurality of BB processors 934 and the plurality of RF circuits 935, but the wireless communication interface 933 may also include the single BB processor 934 or the single RF circuit 935.

Furthermore, the wireless communication interface 933 may support another type of wireless communication scheme such as short-distance wireless communication schemes, near field communication schemes, and wireless LAN schemes in addition to cellular communication systems, and in that case, the wireless communication interface 912 may include the BB processor 934 and the RF circuit 935 for each wireless communication scheme.

Each of the antenna switches 936 switches a plurality of circuits (e.g. circuits for different wireless communication schemes) included in the wireless communication interface 933 to which the antennas 937 connect.

Each of the antennas 937 includes a single or a plurality of antenna elements (e.g. antenna elements included in an MIMO antenna), and is used for the wireless communication interface 933 to transmit and receive a wireless signal. The car navigation device 920 may include the plurality of antennas 937 as illustrated in FIG. 16. FIG. 16 illustrates an example in which the car navigation device 920 includes the plurality of antennas 937, but the car navigation device 920 may also include the single antenna 937.

Furthermore, the car navigation device 920 may include the antenna 937 for each wireless communication scheme. In that case, the antenna switches 936 may be omitted from the configuration of the car navigation device 920.

The battery 938 supplies electric power to each block of the car navigation device 920 illustrated in FIG. 16 via a feeder line that is partially illustrated in the figure as a dashed line. The battery 938 accumulates the electric power supplied from the vehicle.

The processing unit 460 described with reference to FIG. 5 may be implemented by the wireless communication interface 933 in the car navigation device 92 illustrated in FIG. 16. At least a part of these functions may be implemented by the processor 921.

The technology according to the present disclosure may be implemented as an in-vehicle system (or vehicle) 940 including one or more blocks of the car navigation device 920, the in-vehicle network 941, and a vehicle module 942. The vehicle module 942 generates vehicle data such as car speed, engine speed, and trouble information, and outputs the generated data to the in-vehicle network 941.

6. CONCLUSION

Each node and each processing according to the embodiments of the present disclosure have been described so far with reference to FIGS. 1 to 16. According to an embodiment of the present disclosure, the sleep mode information acquisition unit 131 acquires sleep mode information indicating a sleep mode selected for a target base station from the plurality of sleep modes for setting a base station in the sleep state. The sleep mode application unit 133 then applies the sleep mode selected for a target base station to the target base station.

Accordingly, simply selecting a sleep mode makes it possible to cause various kinds of sleep. That is to say it is possible to perform on/off control suitable for individual base stations with a lighter load.

For example, the plurality of sleep modes includes two or more types of sleep modes for setting a base station in the sleep state from different angles.

Accordingly, simply selecting a sleep mode makes it possible to cause sleep from a variety of angles. Various kinds of sleep can be specified with a smaller amount of information. As a result, a smaller amount of information is transmitted, and then the overhead may be decreased. In this way, it is possible to perform on/off control suitable for individual base stations with a lighter load.

For example, the sleep mode information acquisition unit 131 acquires, as the sleep mode information, information indicating a combination of two or more types of sleep modes selected for a target base station from the plurality of sleep modes. The sleep mode application unit 133 then applies a combination of two or more types of sleep modes to the target base station.

This makes is possible to set a base station in the sleep state from a variety of angles. That is to say, it is possible to perform on/off control more suitable for individual base stations with a lighter load.

For example, the sleep mode application unit 133 applies the sleep mode selected for the target base station to the target base station by scheduling the sleep mode.

As a first example, the sleep mode application unit 133 periodically schedules a sleep mode.

For example, if a specific range within which to set a base station in the sleep state is decided in advance, this makes it possible to automatically set a base station in the sleep state without fail.

As a second example, the sleep mode application unit 133 performs the scheduling in accordance with a request of a sleep mode.

For example, this makes it possible to set a base station in the sleep mode whenever necessary.

For example, the feedback acquisition unit 135 acquires feedback information indicating a result of an evaluation of the application of a sleep mode selected for a target base station to the target base station.

For example, this makes it possible to reflect the feedback information to decide a specific range within which to set a base station in the sleep state and to select a sleep mode. As a result, for example, a specific range can be decided and a sleep mode can be selected more appropriately in the future. That is to say, it is possible to cause a base station to sleep more precisely.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, an example has been described in which an SMM (such as the sleep mode information acquisition unit, the sleep mode application unit, and the feedback acquisition unit, in particular) is implemented as a device different from a base station, but the present disclosure is not limited to such an example. The SMM (such as the sleep mode information acquisition unit, the sleep mode application unit, and the feedback acquisition unit, in particular) may be implemented by any of base stations. As an example, the SMM may be implemented by a macro cell base station, and the macro cell base station may apply a sleep mode to the macro cell base station and one or more small base stations. As another example, the SMM may be implemented by a representative small cell base station, and the small cell base station may apply a sleep mode to a plurality of small cell base stations including the small cell base station. As still another example, the SMM may be implemented by individual base stations, and the individual base stations may apply a sleep mode to themselves.

Although an example is described in which the communication system is a system that is compliant with LTE, LTE-Advanced, or a communication scheme that conforms to them, the present disclosure is not limited to such an example. For example, the communication system may be a system that conforms to another communication standard.

Processing steps in the communication control processing described herein do not necessarily have to be performed in the chronological order described in the flowcharts. For example, the processing steps in the communication control processing may be performed in order different from the order described as the flowcharts, or may be performed in parallel.

It is possible to produce a computer program for causing hardware such as a CPU, ROM, and RAM built in a communication control device (such as the SMM or the base station device) to execute a function corresponding to each configuration of the communication control device. There may also be provided a storage medium having the computer program stored therein. There may also be provided an information processing device (e.g. processing circuit or chip) including memory (e.g. ROM and RAM) having the computer program stored therein and a processor (e.g. CPU) that executes the computer program.

It should be noted that the advantageous effects described herein are merely descriptive or illustrative, but not limitative. That is, the technology according to the present disclosure may attain another advantageous effect obvious to those skilled in the art from the present specification in combination with the advantageous effect discussed above or instead of the advantageous effects.

Additionally, the present technology may also be configured as below.

(1)

A communication control device including:

an acquisition unit configured to acquire information indicating a sleep mode selected for a target base station from a plurality of sleep modes for setting a base station in a sleep state; and an application unit configured to apply the sleep mode selected for the target base station to the target base station.

(2)

The communication control device according to (1), wherein the plurality of sleep modes include two or more types of sleep modes for setting the base station in the sleep mode from different angles.

(3)

The communication control device according to (2), wherein the plurality of sleep modes include one or more frequency sleep modes for setting the base station in the sleep state in any of frequency bands.

(4)

The communication control device according to (3), wherein the plurality of sleep modes include at least two frequency sleep modes for setting the base station in the sleep state in frequency bands of different granularities.

(5)

The communication control device according to any one of (2) to (4), wherein the plurality of sleep modes include one or more channel sleep modes for setting the base station in the sleep state in any of channels.

(6)

The communication control device according to (5), wherein the plurality of sleep modes include at least two channel sleep modes for setting the base station in the sleep state in different channels.

(7)

The communication control device according to any one of (2) to (6), wherein the plurality of sleep modes include one or more link sleep modes for setting the base station in the sleep state in one or both of a downlink and an uplink.

(8)

The communication control device according to any one of (2) to (7), wherein the plurality of sleep modes include one or more time sleep modes for setting the base station in the sleep state at any of time.

(9)

The communication control device according to (8), wherein the plurality of sleep modes include at least two time sleep modes for setting the base station in the sleep state at time of different granularities.

(10)

The communication control device according to any one of (2) to (9), wherein the acquisition unit acquires, as the information indicating the sleep mode, information indicating a combination of two or more types of sleep modes selected for the target base station from the plurality of sleep modes, and wherein the application unit applies the combination of the two or more types of sleep modes to the target base station.

(11)

The communication control device according to any one of (1) to (10), wherein the acquisition unit acquires, for each of a plurality of target base stations, information indicating a sleep mode selected from the plurality of sleep modes, and wherein the application unit applies the sleep mode selected from the plurality of sleep modes to each of the plurality of target base stations.

(12)

The communication control device according to (11), wherein the application unit applies a predetermined control parameter regarding wireless communication to any of the plurality of target base stations on the basis of an application situation of a sleep mode to the plurality of target base stations.

(13)
The communication control device according to any one of (1) to (12),
wherein the application unit applies the sleep mode selected for the target base station to the target base station by scheduling the sleep mode.
(14)
The communication control device according to (13),
wherein the application unit periodically schedules the sleep mode.
(15)
The communication control device according to (13) or (14),
wherein the application unit schedules the sleep mode in accordance with a request of the sleep mode.
(16)
The communication control device according to (15),
wherein the request is made in accordance with a result obtained through monitoring done by the base station, and
wherein the monitoring includes monitoring any of a traffic volume, a number of terminal devices, an interference level, and a communication quality.
(17)
The communication control device according to any one of (1) to (16),
wherein the sleep mode selected from the plurality of sleep modes is selected on the basis of statistical information on a base station.
(18)
The communication control device according to any one of (1) to (17), further including:
an acquisition unit configured to acquire feedback information indicating a result of an evaluation of application of the sleep mode selected for the target base station to the target base station.
(19)
A communication control method including:
acquiring information indicating a sleep mode selected for a target base station from a plurality of sleep modes for setting a base station in a sleep state; and
applying, by a processor, the sleep mode selected for the target base station to the target base station.
(20)
A communication control device including:
an acquisition unit configured to, when information indicating a sleep mode selected from a plurality of sleep modes for setting a base station in a sleep state is provided, acquire the information indicating the sleep mode; and
a control unit configured to control an operation of the base station in accordance with the sleep mode.

REFERENCE SIGNS LIST 1 communication system
20 macro cell
30 small cell
100 sleep mode manager (SMM)
151 sleep mode information acquisition unit
153 sleep mode application unit
155 feedback acquisition unit
200 macro cell base station
251 monitoring unit
253 sleep mode request unit
255 information acquisition unit
257 control unit
259 feedback unit
300 small cell base station
351 monitoring unit
353 sleep mode request unit
355 information acquisition unit
357 control unit
359 feedback unit
400 terminal device
460 processing unit

The invention claimed is:
1. A communication control device, comprising:
one or more processors configured to:
acquire first information and second information to set a base station of a plurality of base stations in a sleep state,
wherein the first information indicates a combination of different sleep modes from a plurality of sleep modes for the base station, the plurality of sleep modes comprising at least one link sleep mode, at least one time sleep mode, at least one frequency sleep mode, and at least one channel sleep mode, and
wherein the second information indicates a period of time for the combination of different sleep modes to set the base station in the sleep state;
generate scheduling information of the combination of different sleep modes, based on at least one of the first information or the second information;
transmit the scheduling information to the base station to apply the combination of different sleep modes to the base station;
receive from the base station, feedback information comprising at least one of an amount of power consumption of the base station, an interference level between the plurality of base stations, or a communication quality of the base station; and
control the at least one of the first information or the second information based on the feedback information.
2. The communication control device according to claim 1, wherein the plurality of sleep modes include at least two types of sleep modes to set the base station in the sleep state from different angles.
3. The communication control device according to claim 2, wherein the base station is set in the sleep state in a frequency band based on the at least one frequency sleep mode.
4. The communication control device according to claim 2, wherein the base station is set in the sleep state in frequency bands of different granularities based on a plurality of frequency sleep modes.
5. The communication control device according to claim 2, wherein the base station is set in the sleep state in a channel of a plurality of channels based on the at least one channel sleep mode.
6. The communication control device according to claim 2, wherein the base station is set in the sleep state in different channels of a plurality of channels based on a plurality of channel sleep modes.
7. The communication control device according to claim 2, wherein the base station is set in the sleep state in at least one of a downlink or an uplink based on the at least one link sleep mode.
8. The communication control device according to claim 2, wherein the base station is set in the sleep state for a time period based on the at least one time sleep mode.
9. The communication control device according to claim 2, wherein the base station is set in the sleep state for time periods of different granularities based on a plurality of time sleep modes.

10. The communication control device according to claim 1,
wherein the first information further indicates a respective sleep mode of the plurality of sleep modes, for each of the plurality of base stations, and
wherein the one or more processors are further configured to transmit the scheduling information to each of the plurality of base stations to apply the respective sleep mode to a respective one of the plurality of base stations.

11. The communication control device according to claim 1, wherein the one or more processors are further configured to transmit the scheduling information to the base station to apply a control parameter of wireless communication to the base station.

12. The communication control device according to claim 1, wherein the one or more processors are further configured to transmit the scheduling information to schedule the combination of different the sleep modes to the base station.

13. The communication control device according to claim 12, wherein the one or more processors are further configured to transmit the scheduling information to periodically schedule the combination of different sleep modes to the base station.

14. The communication control device according to claim 12, wherein the one or more processors are further configured to transmit the scheduling information to schedule the combination of different sleep modes based on a request for the combination of different sleep modes.

15. The communication control device according to claim 14,
wherein the request is based on a monitoring result of the base station, and
wherein the monitoring result includes an output of measurement of at least one of a traffic volume in a cell of the base station, a number of terminal devices in the cell, the interference level between the plurality of base stations, or the communication quality of the base station.

16. The communication control device according to claim 1, wherein the period of time of the combination of different sleep modes is based on statistical information of the base station.

17. The communication control device according to claim 1, wherein the feedback information indicates a result of an evaluation of application of the combination of different sleep modes to the base station.

18. A communication control method, comprising:
acquiring first information and second information for setting a base station of a plurality of base stations in a sleep state,
wherein the first information indicates a combination of different sleep modes from a plurality of sleep modes for the base station, the plurality of sleep modes comprising at least one link sleep mode, at least one time sleep mode, at least one frequency sleep mode, and at least one channel sleep mode, and
wherein the second information indicates a period of time for the combination of different sleep modes to set the base station in the sleep state;
generating scheduling information of the combination of different sleep modes, based on at least one of the first information or the second information;
transmitting the scheduling information to the base station to apply the combination of different sleep modes to the base station;
receiving from the base station, feedback information comprising at least one of an amount of power consumption of the base station, an interference level between the plurality of base stations, or a communication quality of the base station; and
controlling the at least one of the first information or the second information based on the feedback information.

19. A communication control device, comprising:
one or processors configured to:
receive scheduling information that comprise at least one of first information or second information,
wherein the first information indicates a combination of different sleep modes from a plurality of sleep modes, for a base station of a plurality of base stations, the plurality of sleep modes comprising at least one link sleep mode, at least one time sleep mode, at least one frequency sleep mode, and at least one channel sleep mode, and
wherein the second information indicates a period of time for the combination of different sleep modes to set the base station in a sleep state;
control an operation of the base station based on the scheduling information; and
transmit feedback information to control the at least one of the first information or the second information,
wherein the feedback information comprises at least one of an amount of power consumption of the base station, an interference level between the plurality of base stations, or a communication quality of the base station.

* * * * *